United States Patent
Park et al.

(10) Patent No.: US 9,825,743 B2
(45) Date of Patent: Nov. 21, 2017

(54) METHOD AND APPARATUS FOR TRANSMITTING UPLINK SIGNAL IN WIRELESS COMMUNICATION SYSTEM

(71) Applicant: LG ELECTRONICS INC., Seoul (KR)

(72) Inventors: Jonghyun Park, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/203,660

(22) Filed: Jul. 6, 2016

(65) Prior Publication Data

US 2017/0005765 A1 Jan. 5, 2017

Related U.S. Application Data

(63) Continuation of application No. 14/376,829, filed as application No. PCT/KR2013/001322 on Feb. 20, 2013, now Pat. No. 9,401,790.

(60) Provisional application No. 61/600,999, filed on Feb. 20, 2012, provisional application No. 61/602,587, (Continued)

(51) Int. Cl.
*H04W 4/00* (2009.01)
*H04L 5/00* (2006.01)
*H04L 1/18* (2006.01)
*H04L 27/26* (2006.01)

(52) U.S. Cl.
CPC .......... *H04L 5/0048* (2013.01); *H04L 1/1861* (2013.01); *H04L 5/0012* (2013.01); *H04L 5/0023* (2013.01); *H04L 5/0035* (2013.01); *H04L 27/2613* (2013.01)

(58) Field of Classification Search
CPC ..................................................... H04L 5/0048
See application file for complete search history.

(56) References Cited

U.S. PATENT DOCUMENTS

| 8,634,362 B2 | 1/2014 | Montojo et al. |
| 8,693,420 B2 | 4/2014 | Qu |
| 9,401,790 B2 * | 7/2016 | Park ...................... H04L 5/0023 |

(Continued)

FOREIGN PATENT DOCUMENTS

| CN | 101882980 | 11/2010 |
| CN | 102158252 | 8/2011 |

(Continued)

OTHER PUBLICATIONS

The State Intellectual Property Office of the People's Republic of China Application Serial No. 201380010239.0, Office Action dated Sep. 27, 2016, 13 pages.

(Continued)

*Primary Examiner* — Maharishi Khirodhar
(74) *Attorney, Agent, or Firm* — Lee Hong Degerman Kang Waimey

(57) ABSTRACT

A method for transmitting an uplink signal at a UE in a wireless communication system includes, when a virtual cell ID for a reference signal for demodulation of a physical uplink channel is provided, generating a sequence of the reference signal on the basis of the virtual cell ID, and transmitting the generated reference signal to an eNB. A sequence hopping pattern of the reference signal can be determined on the basis of the virtual cell ID.

8 Claims, 14 Drawing Sheets

PUCCH format 1a/1b structure (normal CP)

Related U.S. Application Data filed on Feb. 23, 2012, provisional application No. 61/619,408, filed on Apr. 2, 2012.

(56) References Cited

U.S. PATENT DOCUMENTS

| | | | |
|---|---|---|---|
| 9,474,050 B2* | 10/2016 | Park | H04L 1/00 |
| 2008/0298433 A1 | 12/2008 | Tiirola et al. | |
| 2010/0062783 A1 | 3/2010 | Luo et al. | |
| 2010/0284265 A1 | 11/2010 | Ogawa et al. | |
| 2010/0284363 A1 | 11/2010 | Ahn et al. | |
| 2010/0285810 A1 | 11/2010 | Ko et al. | |
| 2011/0034175 A1 | 2/2011 | Fong et al. | |
| 2011/0077038 A1 | 3/2011 | Montojo et al. | |
| 2011/0235597 A1 | 9/2011 | Montojo et al. | |
| 2011/0243034 A1 | 10/2011 | Yamada et al. | |
| 2011/0269489 A1 | 11/2011 | Khoshnevis et al. | |
| 2012/0008556 A1 | 1/2012 | Noh et al. | |
| 2012/0014318 A1 | 1/2012 | Luo et al. | |
| 2013/0077569 A1 | 3/2013 | Nam et al. | |
| 2013/0201942 A1 | 8/2013 | Kim et al. | |
| 2014/0064251 A1 | 3/2014 | Skov et al. | |
| 2015/0029968 A1 | 1/2015 | Park et al. | |
| 2016/0286538 A1* | 9/2016 | Park | H04L 1/00 |

FOREIGN PATENT DOCUMENTS

| | | |
|---|---|---|
| CN | 102158449 | 8/2011 |
| CN | 102223726 | 10/2011 |
| EP | 2385652 | 11/2011 |
| EP | 2387268 | 11/2011 |
| JP | 2009-540755 | 11/2009 |
| JP | 2011-501517 | 1/2011 |
| JP | 2011-509600 | 3/2011 |
| JP | 2011-142498 | 7/2011 |
| JP | 2011-250139 | 12/2011 |
| JP | 2013507061 | 2/2013 |
| JP | 2013535857 | 9/2013 |
| JP | 2014527750 | 10/2014 |
| KR | 10-2009-0112534 | 10/2009 |
| KR | 10-2011-0000536 | 1/2011 |
| KR | 10-2011-0030400 | 3/2011 |
| KR | 10-2011-0125618 | 11/2011 |
| WO | 2009/014048 | 1/2009 |
| WO | 2011/041552 | 4/2011 |
| WO | 2011/043298 | 4/2011 |
| WO | 2012/005444 | 1/2012 |
| WO | 2013/022244 | 2/2013 |
| WO | 2013/049769 | 4/2013 |

OTHER PUBLICATIONS

The State Intellectual Property Office of the People's Republic of China Application Serial No. 201380010229.7, Office Action dated Oct. 9, 2016, 18 pages.
CATT, "Considerations on UE-specific DM-RS configuration", R1-113732, 3GPP TSG RAN WG1 Meeting #67, Nov. 2011, 3 pages.
CATT, "Further details on UE-specific UL DMRS," 3GPP TSG RAN WG1 Meeting #68, R1-120106, Feb. 2012, 3 pages.
LG Electronics, "UL-DMRS enhancements for uplink CoMP," 3GPP TSG RAN WG1 Meeting #68bis, R1-121861, Mar. 2012, 5 pages.
Zte, et al., "Way Forward on PUSCH DMRS Signaling", R1-122946, 3GPP TSG RAN WG1 #69, May 2012, 3 pages.
Email Rapporteur (KDDI), "Email discussion summary on the remaining issues of PUCCH resource and sequence", R1-123240, 3GPP TSG RAN WG1 Meeting #70, Aug. 2012, 22 pages.
Panasonic, "Remaining issues on SRS enhancements in Rel.11", R1-123284, 3GPP TSG-RAN WG1 Meeting #70, Aug. 2012, 7 pages.

LG Electronics, "PUCCH enhancements for CoMP in Rel-11", R1-123523, 3GPP TSG RAN WG1 Meeting #70, Aug. 2012, 3 pages.
LG Electronics, "Remaining issues for uplink RSs", R1-123937, 3GPP TSG RAN WG1 Meeting #70, Aug. 2012, 3 pages.
LG Electronics, "Enhancement of PUSCH DMRS for uplink CoMP", R1-122300, 3GPP TSG RAN WG1 Meeting #69, May 2012, 3 pages.
Sharp, Panasonic, "Correction for DMRS group hopping and sequence hopping", R1-122381, 3GPP TSG-RAN WG1 Meeting #69, May 2012, 2 pages.
United States Patent and Trademark Office U.S. Appl. No. 14/376,598, Office Action dated Dec. 22, 2015, 14 pages.
Huawei, et al., "Enhancements of uplink DMRS for UL CoMP," 3GPP TSG RAN WG1 Meeting #68, R1-120038, Feb. 2012, 5 pages.
European Patent Office Application Serial No. 13751474.1, Search Report dated Oct. 14, 2015, 10 pages.
PCT International Application No. PCT/KR2013/001322, Written Opinion of the International Searching Authority dated Jun. 20, 2013, 1 page.
Panasonic, "UE-specific base sequence assignment for UL CoMP," 3GPP TSG-RAN WG1 Meeting #68, R1-120229, Feb. 2012, 6 pages.
3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 13 pages.
CATT, "Discussion on VCID for PUSCH DMRS and TP for 36.211," 3GPP TSG RAN WG1 Meeting #70bis, R1-124099, Oct. 2012, 7 pages.
3rd Generation Partnership Project (3GPP), "Technical Specification Group Radio Access Network; Evolved Universal Terrestrial Radio Access (E-UTRA); Physical Channels and Modulation (Release 11)," 3GPP TS 36.211 V11.0.0, Sep. 2012, 6 pages.
United States Patent and Trademark Office U.S. Appl. No. 15/174,176, Office Action dated Sep. 8, 2016, 67 pages.
NTT Docomo, "Views on UE-Specific UL RS Assignment," 3GPP TSG RAN WG1 Meeting #68, R1-120408, Feb. 2012, 4 pages.
LTE, "Evolved Universal Terrestrial Radio Access (E-UTRA); Physical Channels and Modulation (3GPP TS 36.211 version 10.4.0 Release 10)," ETSI TS 136 211, Jan. 2012, XP014069597, 103 pages.
European Patent Office Application Serial No. 13751096.2, Search Report dated Oct. 13, 2015, 6 pages.
European Patent Office Application Serial No. 13751503.7, Search Report dated Oct. 13, 2015, 5 pages.
Panasonic, "Comparison of Orthogonal/Non-orthogonal CoMP transmission for PUCCH," 3GPP TSG RAN WG1 Meeting #58, R1-093460, Aug. 2009, 5 pages.
PCT International Application No. PCT/KR2013/001326, Written Opinion of the International Searching Authority dated Jun. 21, 2013, 1 page.
United States Patent and Trademark Office U.S. Appl. No. 14/376,829, Office Action dated Dec. 2, 2015, 54 pages.
Panasonic, "Uplink DMRS sequence in RACH procedure," 3GPP TSG RAN WG1 Meeting #65, R1-111936, May 2011, 3 pages.
Pantech, "UL DM-RS enhancements for Rel-11," 3GPP TSG RAN WG1 Meeting #68, R1-120324, Feb. 2012, 7 pages.
PCT International Application No. PCT/KR2013/001329, Written Opinion of the International Searching Authority dated Jun. 26, 2013, 1 page.
LG Electronics, "PUCCH for UL CoMP Scenarios," 3GPP TSG RAN WG1 Meeting #68, R1-120445, Feb. 2012, 4 pages.
Panasonic, "Enhancement of control signalling for UL CoMP," 3GPP TSG-RAN WG1 Meeting #68, R1-120232, Feb. 2012, 4 pages.
U.S. Appl. No. 14/376,365, Office Action dated Nov. 4, 2015, 12 pages.
U.S. Appl. No. 14/376,596, Office Action dated Nov. 20, 2015, 8 pages.

* cited by examiner

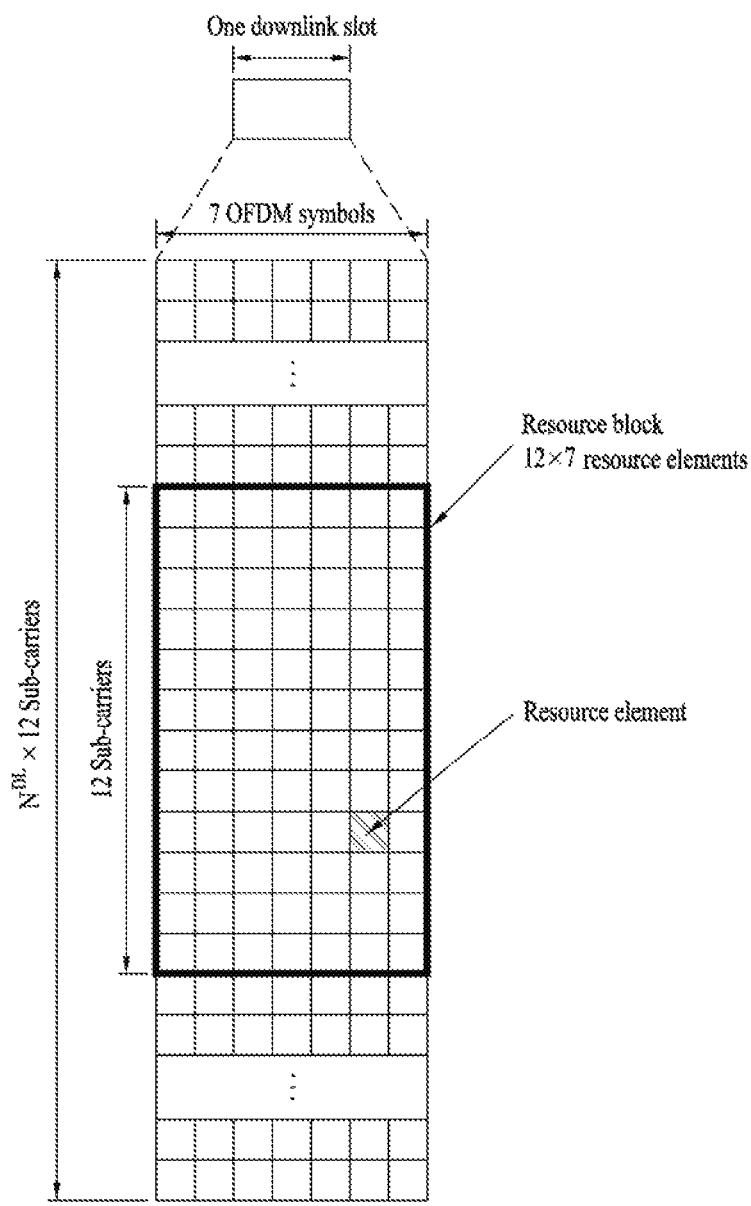

PUCCH format 1a/1b structure (normal CP)

PUCCH format 1a/1b structure (extended CP)

PUCCH format 2/2a/2b structure (normal CP)

PUCCH format 2/2a/2b structure (extended CP)

METHOD AND APPARATUS FOR TRANSMITTING UPLINK SIGNAL IN WIRELESS COMMUNICATION SYSTEM

CROSS-REFERENCE TO RELATED APPLICATIONS

This application is a continuation of U.S. patent application Ser. No. 14/376,829, filed on Aug. 5, 2014, now U.S. Pat. No. 9,401,790, which is the National Stage filing under 35 U.S.C. 371 of International Application No. PCT/KR2013/001322, filed on Feb. 20, 2013, which claims the benefit of U.S. Provisional Application No. 61/600,999, filed on Feb. 20, 2012, 61/602,587, filed on Feb. 23, 2012 and 61/619,408, filed on Apr. 2, 2012, the contents of which are all hereby incorporated by reference herein in their entirety.

TECHNICAL FIELD

The present description relates to wireless communication, and more specifically, to a method and apparatus for transmitting an uplink signal.

BACKGROUND ART

To satisfy increasing data throughput in a wireless communication system, MIMO, multi-base station cooperation technology, etc. for increasing throughput of data transmitted in a limited frequency band have been developed.

An enhanced wireless communication system that supports multi-base station cooperative communication through which a plurality of eNBs communicate with user equipments (UEs) using the same time-frequency resource can provide increased data throughput, compared to a conventional wireless communication system in which one eNB communicates with UEs. eNBs participating in cooperative communication may be referred to as cells, antenna ports, antenna port groups, RRHs (Remote Radio Heads), transport points, reception points, access points, etc.

DISCLOSURE

Technical Problem

With the introduction of new wireless communication technology, the number of UEs to which an eNB needs to provide a service in a predetermined resource region increases and the quantity of data and control information transmitted/received between the eNBs and UEs to which the eNB provides the service also increases. Since the quantity of radio resource that can be used for the eNB to communicate with the UEs is finite, there is a need for a new method by which the ENB efficiently transmits/receives uplink/downlink data and/or uplink/downlink control information to/from UEs using finite radio resource.

An object of the present invention devised to solve the problem lies on a new method for transmitting an uplink reference signal to support enhanced uplink transmission and a method for successfully receiving the uplink reference signal at an uplink signal receiver.

The technical problems solved by the present invention are not limited to the above technical problems and those skilled in the art may understand other technical problems from the following description.

Technical Solution

The object of the present invention can be achieved by providing a method for transmitting an uplink signal at a user equipment (UE) in a wireless communication system, the method including, when a virtual cell ID $n_{ID}^{PUSCH}$ for a reference signal for demodulation of a physical uplink shared channel (PUSCH) is provided, generating a sequence of the reference signal on the basis of $n_{ID}^{PUSCH}$, and transmitting the generated reference signal to an eNB. A pseudo-random sequence generator used to determine sequence hopping of the reference signal may be initialized according to $$c_{init} = \left\lfloor \frac{n_{ID}^{PUSCH}}{30} \right\rfloor \cdot 2^5 + f_{ss}^{PUSCH}$$

at the start of each radio frame, $c_{init}$ may be an initial value of a pseudo-random sequence and $f_{ss}^{PUSCH}$ may be a sequence shift pattern of the reference signal.

In another aspect of the present invention, provided herein is a UE device for transmitting an uplink signal, including a receiver, a transmitter, and a processor, wherein, when a virtual cell ID $n_{ID}^{PUSCH}$ for a reference signal for demodulation of a PUSCH is provided, the processor is configured to generate a sequence of the reference signal on the basis of $n_{ID}^{PUSCH}$ and to transmit the generated reference signal to an eNB. A pseudo-random sequence generator used to determine sequence hopping of the reference signal may be initialized according to $$c_{init} = \left\lfloor \frac{n_{ID}^{PUSCH}}{30} \right\rfloor \cdot 2^5 + f_{ss}^{PUSCH}$$

at the start of each radio frame, $c_{init}$ may be an initial value of a pseudo-random sequence and $f_{ss}^{PUSCH}$ may be a sequence shift pattern of the reference signal.

The following may be commonly applied to the above-described embodiments of the present invention.

$f_{ss}^{PUSCH}$ may be determined according to $f_{ss}^{PUSCH} = n_{ID}^{PUSCH}$ mod 30 and mod may denote a modulo operation.

Sequence hopping may be applied when sequence group hopping for the reference signal is disabled.

Sequence hopping may be applied when the length of the reference signal is $M_{sc}^{RS} \geq 6N_{sc}^{RB}$, $M_{sc}^{RS}$ may denote the length of the reference signal and may be defined as $M_{sc}^{RS} = m \cdot N_{sc}^{RB}$, $1 \leq m \leq N_{RB}^{max,UL}$, $N_{RB}^{max,UL}$ may represent a maximum uplink bandwidth configuration and may be expressed by an integer multiple of $N_{sc}^{RB}$, and $N_{sc}^{RB}$ be a resource block size and may be represented by the number of subcarriers.

The number v of a base sequence of the reference signal may be determined according to the sequence hopping.

When a value of $n_{ID}^{PUCCH}$ is not provided, $c_{init}$ may be determined according to $$c_{init} = \left\lfloor \frac{N_{ID}^{cell}}{30} \right\rfloor \cdot 2^5 + f_{ss}^{PUSCH},$$

and $N_{ID}^{cell}$ may be a physical layer cell ID.

When a value of $n_{ID}^{PUSCH}$ is not provided, $f_{ss}^{PUSCH}$ may be determined according to $f_{ss}^{PUSCH} = (N_{ID}^{cell} + \Delta_{ss})$ mod 30, $\Delta_{ss}$ may be set by a higher layer and $\Delta_{ss} \in \{0, 1, \ldots, 29\}$.

$n_{ID}^{PUSCH}$ may be provided by a higher layer.

$n_{ID}^{PUSCH}$ may be set to one of 0 to 509.

$n_{ID}^{PUSCH}$ may be set to a value making a base sequence of the reference signal for the UE identical to a base sequence for other UE which MU-MIMO (Multi-User-Multiple Input Multiple Output)-paired with the UE.

The reference signal may be transmitted on one SC-FDMA (Single Carrier Frequency Division Multiple Access) symbol in a slot in which the PUSCH is transmitted.

The technical problems solved by the present invention are not limited to the above technical problems and those skilled in the art may understand other technical problems from the following description.

Advantageous Effects

The present invention can provide a new method for transmitting an uplink reference signal to support enhanced uplink transmission and a method for successfully receiving the uplink reference signal at an uplink signal receiver.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 2 illustrates a resource grid;

BEST MODE

Figure 1A:
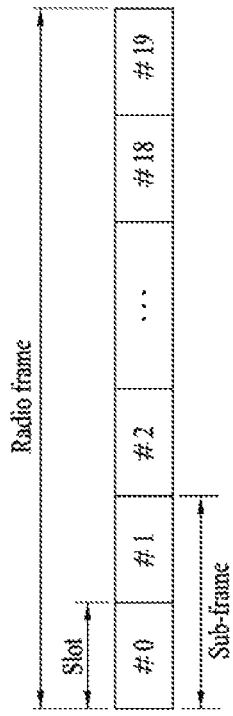
FIGS. 1A and 1B illustrate a radio frame structure.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A radio frame structure of 3GPP LTE is described with reference to FIG. 1.

In a cellular orthogonal frequency division multiplex (OFDM) wireless packet communication system, uplink/downlink data packet transmission is performed on a subframe basis and a subframe is defined as a predetermined time period including a plurality of OFDM symbols. 3GPP LTE supports a type 1 radio frame structure applicable to frequency division duplex (FDD) and a type 2 radio frame structure applicable to time division duplex (TDD).

FIG. 1A illustrates the type 1 radio frame structure. A radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot may include a plurality of OFDM symbols in the time domain and a plurality of resource blocks in the frequency domain. Because 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may be changed according to the configuration of a cyclic prefix (CP). The CP includes an extended CP and a normal CP. For example, if the OFDM symbols are configured by the normal CP, the number of OFDM symbols included in one slot may be seven. If the OFDM symbols are configured by the extended CP, since the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a UE moves at a high speed, the extended CP may be used in order to further reduce interference between symbols.

Figure 1B:
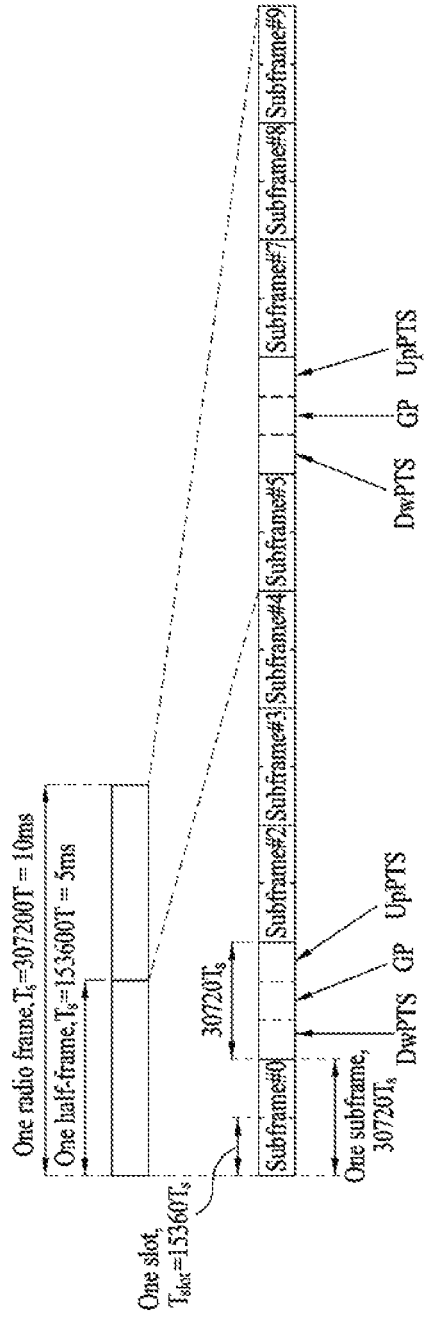

FIG. 1B illustrates the type 2 radio frame structure. The type 2 radio frame includes two half-frames, each of which is made up of five subframes, a downlink pilot time slot (DwPTS), a guard period (GP), and an uplink pilot time slot (UpPTS), in which one subframe consists of two slots. DwPTS is used to perform initial cell search, synchronization, or channel estimation. UpPTS is used to perform channel estimation of a base station and uplink transmission synchronization of a UE. The guard interval (GP) is located between an uplink and a downlink so as to remove interference generated in the uplink due to multi-path delay of a downlink signal. One subframe is composed of two slots irrespective of the radio frame type.

The radio frame structure is purely exemplary and thus the number of subframes in a radio frame, the number of slots in a subframe, or the number of symbols in a slot may vary.

FIG. 2 illustrates a resource grid in a downlink slot. A downlink slot includes 7 OFDM symbols in the time domain and an RB includes 12 subcarriers in the frequency domain, which does not limit the scope and spirit of the present invention. For example, a downlink slot includes 7 OFDM symbols in case of a normal CP, whereas a downlink slot includes 6 OFDM symbols in case of an extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Downlink Subframe Structure

Figure 3:
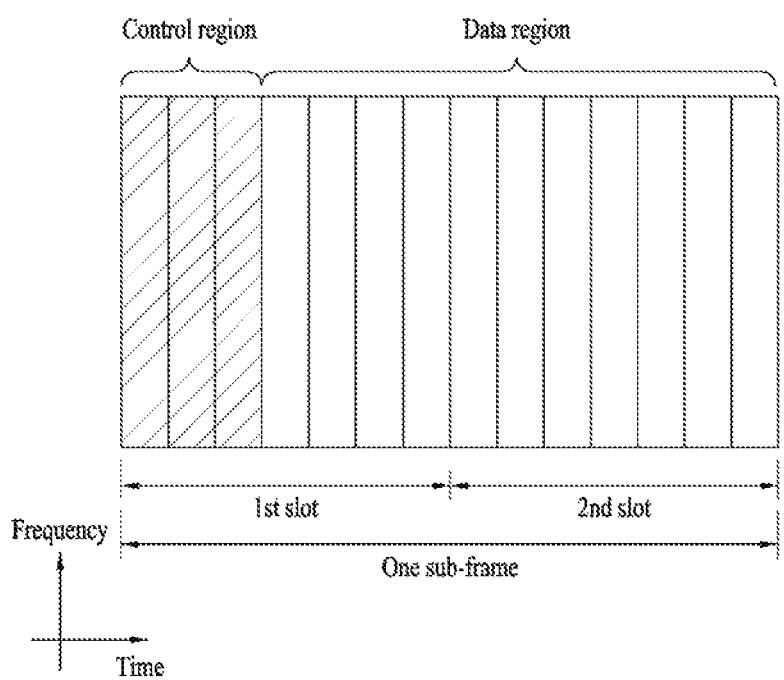
FIG. 3 illustrates a downlink subframe structure.

FIG. 3 illustrates a downlink subframe structure. Up to three OFDM symbols at the start of the first slot in a downlink subframe correspond to a control region to which control channels are allocated and the other OFDM symbols of the downlink subframe correspond to a data region to which a physical downlink shared channel (PDSCH) is allocated. Downlink control channels used in 3GPP LTE include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregation of one or more consecutive control channel elements (CCEs). A CCE is a logical allocation unit used to provide a PDCCH at a coding rate based on the state of a radio channel. A CCE includes a set of REs. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier known as a radio network temporary identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a paging indicator identifier (P-RNTI). If the PDCCH carries system information, particularly, a system information block (SIB), its CRC may be masked by a system information ID and a System Information RNTI (SI-RNTI). To indicate that the PDCCH carries a random access response in response to a random access preamble transmitted by a UE, its CRC may be masked by a random access-RNTI (RA-RNTI).

Downlink Reference Signal

When a packet is transmitted in a wireless communication system, signal distortion may occur during transmission because the packet is transmitted through a radio channel. To successfully receive a distorted signal at a receiver, it is necessary to correct distortion of the received signal using channel information. To detect the channel information, a method of transmitting a signal known to a transmitter and the receiver and detecting the channel information using a degree of distortion when the signal is received through the channel is widely used. The signal is called a pilot signal or a reference signal.

In transmission and reception of data using multiple antennas, the receiver needs to know channel states between transmit antennas and receive antennas to successfully receive a signal. Accordingly, a separate reference signal is needed for each transmit antenna.

Downlink reference signals include a common reference signal (CRS) shared by all UEs in a cell and a dedicated reference signal (DRS) for only a specific UE. Information for channel estimation and demodulation can be provided according to these reference signals. The CRS is used to estimate a channel of a physical antenna, can be commonly received by all UEs in a cell, and is distributed in the overall band. The CRS can be used for acquisition of channel state information (CSI) and data demodulation.

A receiver (UE) can estimate a channel state from the CRS and feed back indicators regarding channel quality, such as a channel quality indicator (CQI), a precoding matrix index (PMI) and/or a rank indicator (RI), to a transmitter (eNB). The CRS may be called a cell-specific reference signal.

The DRS can be transmitted through a corresponding RE when demodulation of data on a PDSCH is needed. The UE may receive information about presence or absence of a DRS from a higher layer and receive information representing that the DRS is valid only when a corresponding PDSCH is mapped. The DRS may also be called a UE-specific reference signal or modulation reference signal (DMRS). The DRS (or UE-specific reference signal) is used for data demodulation. A precoding weight used for a specific UE is used for the DRS during multi-antenna transmission such that an equivalent channel corresponding a combination of a precoding weight transmitted through each transmit antenna and a transmission channel can be estimated when the UE receives the DRS.

Figure 4:
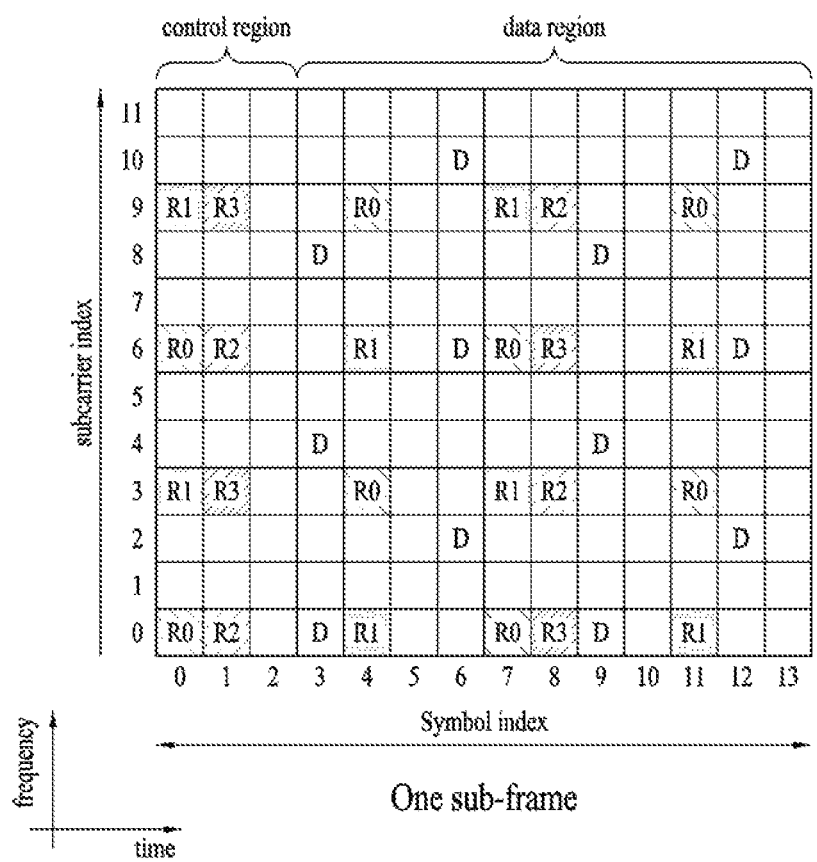
FIG. 4 illustrates an uplink subframe structure.

FIG. 4 illustrates a pattern of matching a CRS and a DRS defined in 3GPP LTE to a downlink RB pair. A downlink RB pair as a unit to which a reference signal is mapped can be represented by a product of one subframe in the time domain and 12 subcarriers in the frequency domain. That is, one RB pair has a length corresponding to 14 OFDM symbols in case of normal CP and a length corresponding to 12 OFDM symbols in case of extended CP. FIG. 4 shows an RB pair in case of normal CP.

FIG. 4 shows positions of reference signals on an RB pair in a system in which an eNB supports four transmit antennas. In FIG. 4, REs denoted by 'R0', 'R1', 'R2' and 'R3' correspond to CRS positions for antenna port indexes 0, 1, 2 and 3. REs denoted by 'D' correspond to DRS positions.

High-order MIMO (Multiple Input Multiple Output), multi-cell transmission, enhanced multi-user (MU)-MIMO, etc. are considered in LTE-A evolved from 3GPP LTE. To efficiently operate reference signals and support enhanced transmission schemes, DRS based data demodulation is being considered. That is, a DRS (or UE-specific reference signal or DMRS) for two or more layers can be defined to support data transmission through an additional antenna, separately from a DRS (corresponding to antenna port index 5) for rank 1 beamforming defined in 3GPP LTE (e.g. release-8). For example, UE-specific reference signal ports supporting up to 8 transmit antenna ports can be defined as antenna port numbers 7 to 12 and can be transmitted in REs which do not overlap with other reference signals.

Furthermore, LTE-A may separately define an RS related to feedback of channel state information (CSI) such as CQI/PMI/RI for a new antenna port as a CSI-RS. For example, CSI-RS ports supporting up to 8 transmit antenna ports can be defined as antenna port numbers 15 to 22 and can be transmitted in REs which do not overlap with other reference signals.

Uplink Subframe Structure

Figure 5:
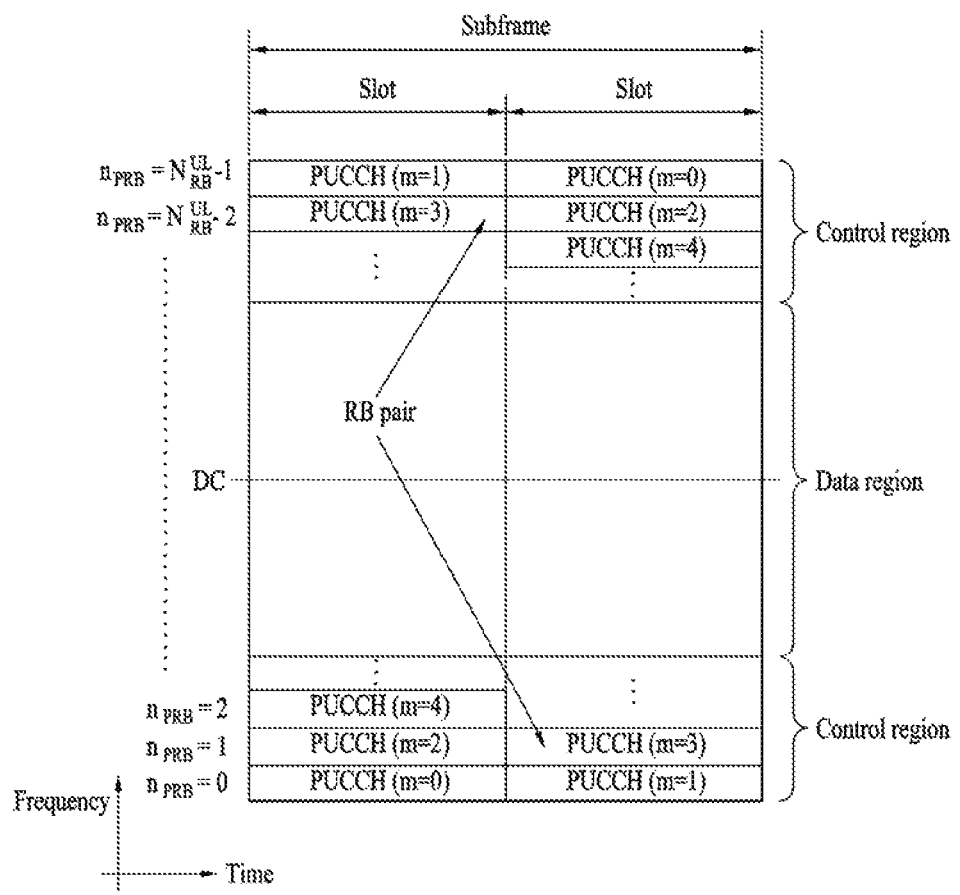
FIG. 5 illustrates a downlink reference signal.

FIG. 5 illustrates an uplink subframe structure.

Referring to FIG. 5, an uplink subframe may be divided into a control region and a data region in the frequency domain. One or more Physical Uplink Control Channels (PUCCHs) carrying uplink control information may be allocated to the control region and one or more Physical Uplink Shared Channels (PUSCHs) carrying user data may be allocated to the data region.

Subcarriers far from a direct current (DC) subcarrier are used for the control region in the UL subframe. In other words, subcarriers at both ends of an uplink transmission bandwidth are allocated for transmission of uplink control information. The DC subcarrier is a component that is spared from signal transmission and mapped to carrier frequency $f_0$ during frequency upconversion. A PUCCH from one UE is allocated to an RB pair in a subframe and the RBs of the RB pair occupy different subcarriers in two slots. This PUCCH allocation is called frequency hopping of an RB pair allocated to a PUCCH over a slot boundary. However, if frequency hopping is not applied, the RB pair occupies the same subcarriers.

A PUCCH may be used to transmit the following control information.

SR (Scheduling Request): used to request UL-SCH resource. This information is transmitted using OOK (On-Off Keying).

HARQ-ACK: response to a PDCCH and/or a response to a downlink data packet (e.g. codeword) on a PDSCH. This information represents whether the PDCCH or PDSCH has been successfully received. 1-bit HARQ-ACK is transmitted in response to a single downlink codeword and 2-bit HARQ-ACK is transmitted in response to two downlink codewords. HARQ-ACK responses include positive ACK (simply, ACK), negative ACK (NACK), DTX (Discontinuous Transmission) and NACK/DTX. Here, the term HARQ-ACK is used with HARQ ACK/NACK and ACK/NACK.

CSI (Channel State Information): This is feedback information about a downlink channel. MIMO-related feedback information includes an RI and a PMI.

The quantity of UCI that can be transmitted by a UE in a subframe depends on the number of SC-FDMA symbols available for control information transmission. SC-FDMA symbols available for UCI correspond to SC-FDMA symbols other than SC-FDMA symbols used for reference signal transmission in a subframe. In the case of a subframe including a sounding reference signal (SRS), the SC-FDMA symbols available for UCI correspond to SC-FDMA symbols other than SC-FDMA symbols used for reference signal transmission and the last SC-FDMA symbol in the subframe. A reference signal is used for PUCCH coherent detection. A PUCCH supports various formats according to transmitted information.

PUCCH format 1 is used to transmit SR, PUCCH format 1a/1b is used to transmit ACK/NACK information, and PUCCH format 2 is used to carry CSI such as CQI/PMI/RI. PUCCH format 2a/2b is used to carry ACK/NACK information with CSI and PUCCH format 3 series is used to transmit ACK/NACK information.

UCI Transmission

FIGS. 6 to 10 illustrate UCI transmission using PUCCH format 1 series, PUCCH format 2 series and PUCCH format 3 series.

In 3GPP LTE/LTE-A, a subframe having a normal CP is composed of two slots each of which includes seven OFDM symbols (or SC-FDMA symbols). A subframe having an extended CP is composed of two slots each of which includes six OFDM symbols (or SC-FDMA symbols). Since the number of OFDM symbols (or SC-FDMA symbols) per subframe depends on a CP length, a PUCCH transmission structure in a UL subframe is varied according to CP length. Accordingly, a method of transmitting UCI in a UL subframe by a UE is varied according to PUCCH format and CP length.

Figure 6:
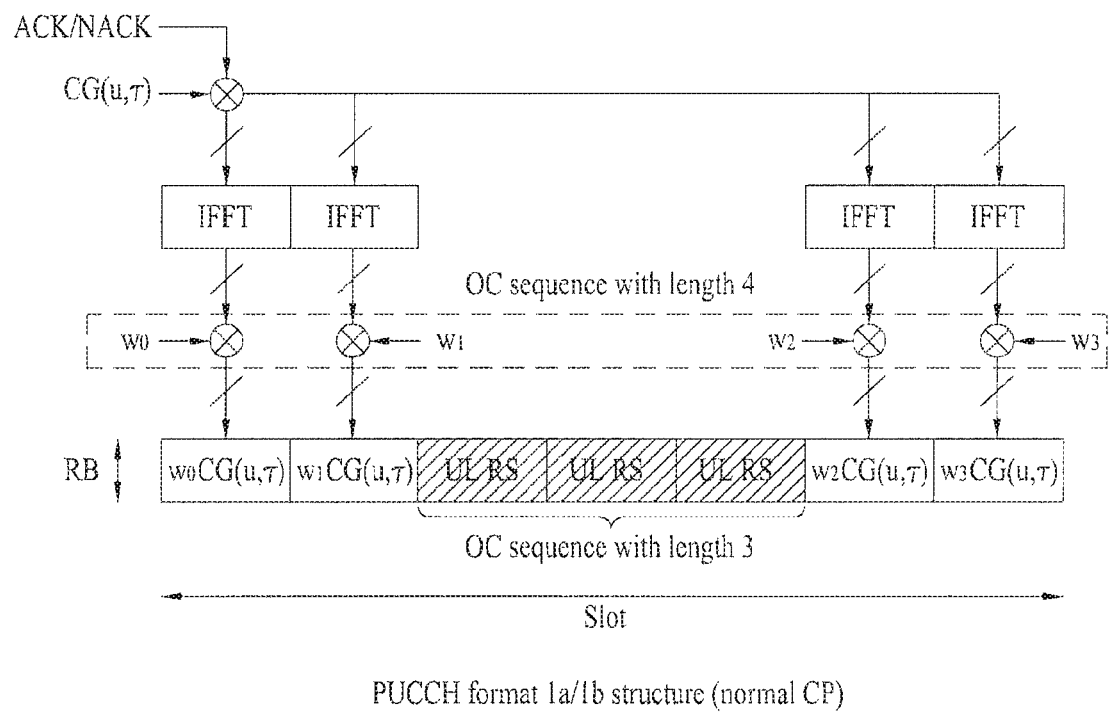
FIGS. 6 to 10 illustrate UCI transmission using PUCCH (Physical Uplink Control Channel) format 1 series, PUCCH format 2 series and PUCCH format 3 series.
Figure 7:
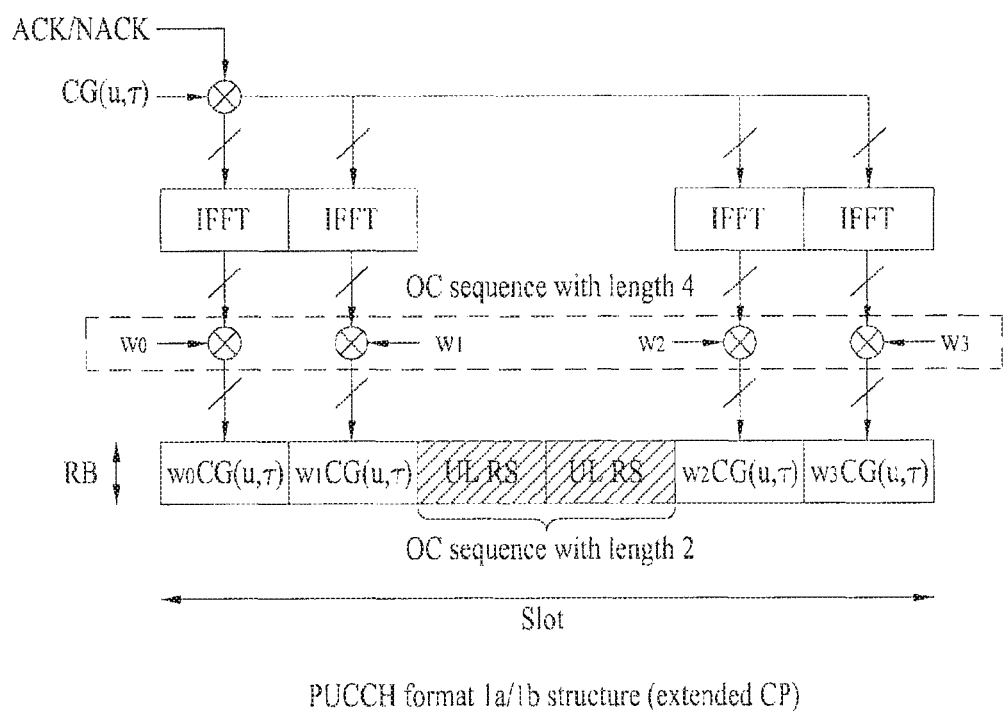

Referring to FIGS. 6 and 7, in case of transmission using PUCCH formats 1a and 1b, the same control information is repeated on a slot basis in a subframe. UEs transmit ACK/NACK signals through different resources composed of different cyclic shifts (CSs) of a CG-CAZAC (Computer- Generated Constant Amplitude Zero Auto Correlation) sequence and orthogonal cover codes (OCC). A CS may correspond to a frequency domain code and an OCC may correspond to a time domain spreading code. An OCC may also be called an orthogonal sequence. An OCC includes a Walsh/DFT (Discrete Fourier Transform) orthogonal code, for example. When the number of CSs is 6 and the number of OCCs is 3, a total of 18 PUCCHs can be multiplexed in the same PRB (Physical Resource Block) on the basis of a single antenna port. An orthogonal sequence $w_0$, $w_1$, $w_2$ and $w_3$ may be applied in a time domain after FFT (Fast Fourier Transform) or in a frequency domain before FFT. A PUCCH resource for ACK/NACK transmission in 3GPP LTE/LTE-A is represented by a combination of the position of a time-frequency resource (e.g. PRB), a cyclic shift of a sequence for frequency spreading and an orthogonal code (or quasi-orthogonal code) for time spreading. Each PUCCH resource is indicated using a PUCCH resource index (PUCCH index). A slot level structure of PUCCH format 1 series for SR transmission is identical to that of PUCCH formats 1a and 1b and a modulation method thereof is different.

Figure 8:
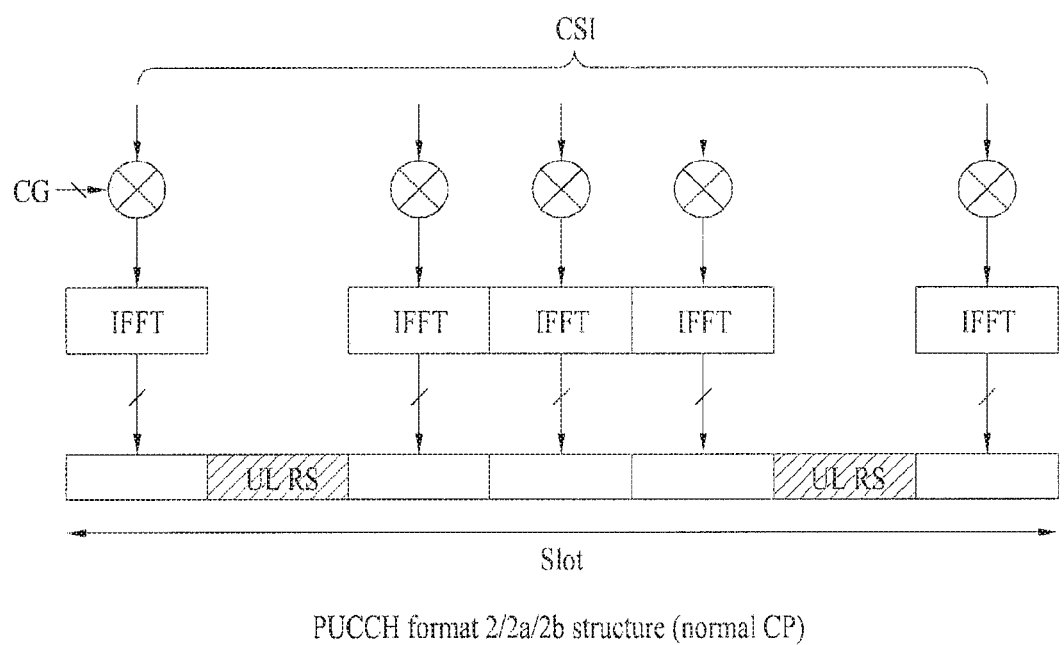
Figure 9:
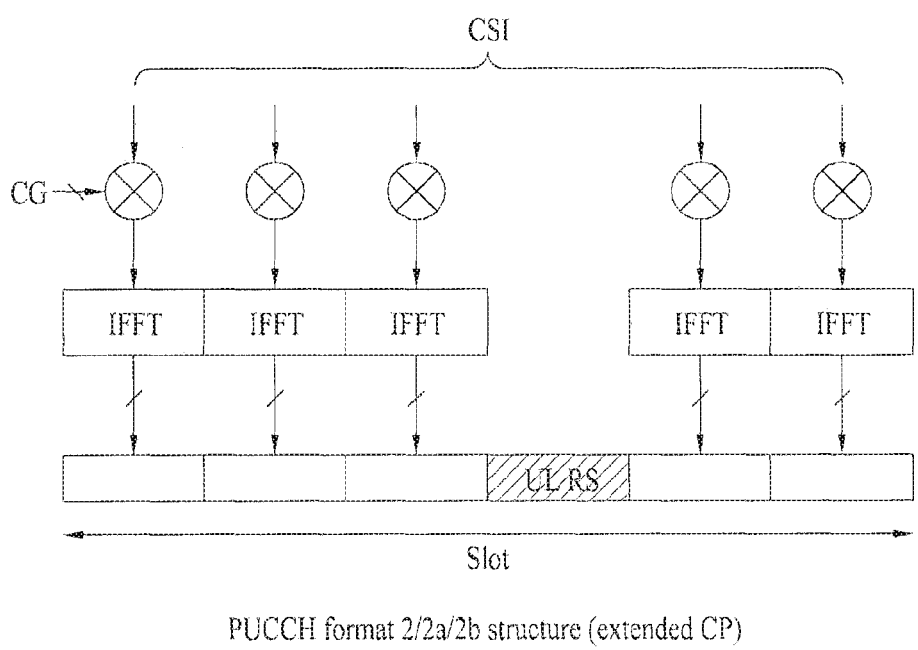

FIG. 8 illustrates transmission of CSI in a UL slot having a normal CP using PUCCH format 2a/2b/2c and FIG. 9 illustrates transmission of CSI in a UL slot having an extended CP using PUCCH format 2a/2b/2c.

Referring to FIGS. 8 and 9, in case of the normal CP, a UL subframe is composed of 10 SC-FDMA symbols excepting symbols carrying UL reference signals (RSs). CSI is coded into 10 transmission symbols (which may be called complex-valued modulation symbols) through block coding. The 10 transmission symbols are respectively mapped to 10 SC-FDMA symbols and transmitted to an eNB.

PUCCH format 1/1a/1b and PUCCH format 2/2a/2b can carry only UCI having up to a predetermined number of bits. However, as the quantity of UCI increases due to introduction of carrier aggregation, a TDD system, a relay system and a multi-node system and an increase in the number of antennas, a PUCCH format, which is called PUCCH format 3, capable of carrying a larger quantity of UCI than PUCCH formats 1/1a/1b/2/2a/2b, is introduced. For example, PUCCH format 3 can be used for a UE for which carrier aggregation is set to transmit a plurality of ACK/NACK signals for a plurality of PDSCHs, received from an eNB through a plurality of downlink carriers, through a specific uplink carrier.

Figure 10:
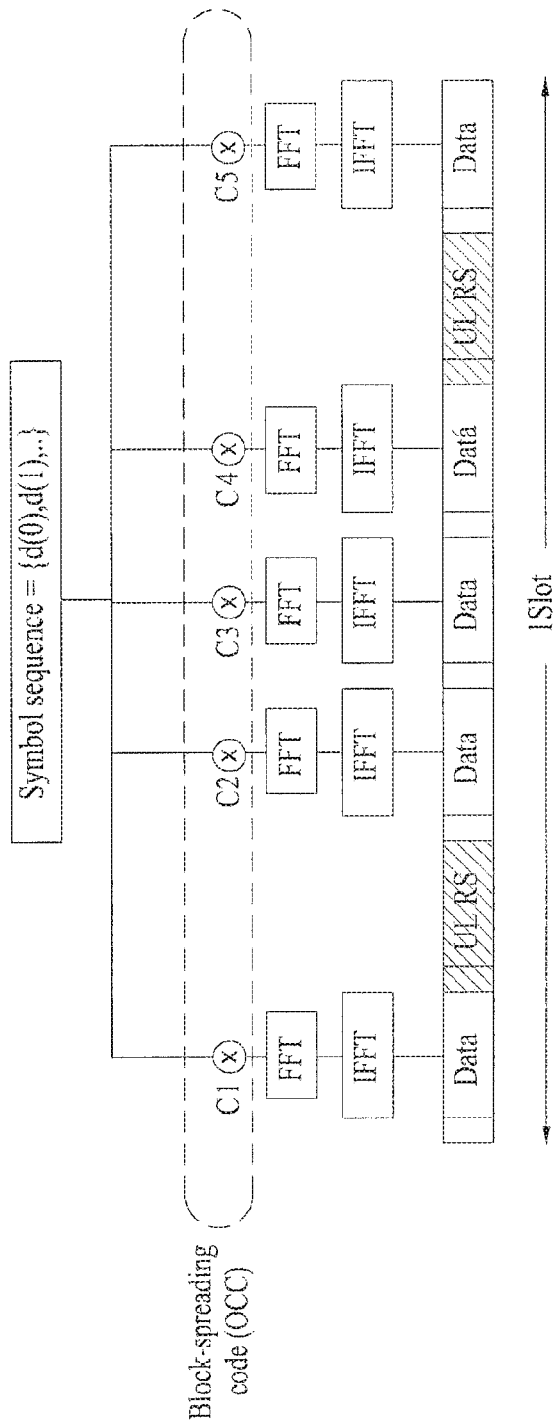

PUCCH format 3 may be configured on the basis of block spreading, for example. Referring to FIG. 10, block spreading time-domain-spreads a symbol sequence using an OCC (or orthogonal sequence) and transmits the spread symbol sequence. According to block spreading, control signals of a plurality of UEs can be multiplexed to the same RB and transmitted to an eNB. In the case of PUCCH format 2, one symbol sequence is transmitted over the time domain, and UCI of UEs is multiplexed using a CS of a CAZAC sequence and transmitted to an eNB. In the case of a new PUCCH format based on block spreading (e.g. PUCCH format 3), one symbol sequence is transmitted over the frequency domain, and UCI of UEs is multiplexed using OCC based time-domain spreading and transmitted to the eNB. Referring to FIG. 8, one symbol sequence is spread using an OCC having length-5 (that is, SF=5) and mapped to 5 SC-FDMA symbols. While FIG. 10 illustrates a case in which two RS symbols are used in one slot, 3 RS symbols may be used and an OCC with SF=4 can be used for symbol sequence spreading and UE multiplexing. Here, the RS symbols can be generated from a CAZAC sequence having a specific CS. A specific OCC can be applied to/multiplied by the RS symbols and then the RS symbols can be transmitted to the eNB. In FIG. 10, DFT may be applied prior to OCC, and FFT (Fast Fourier Transform) may replace DFT.

In FIGS. 6 to 10, a UL RS transmitted with UCI on a PUCCH can be used for the eNB to demodulate the UCI.

Figure 11:
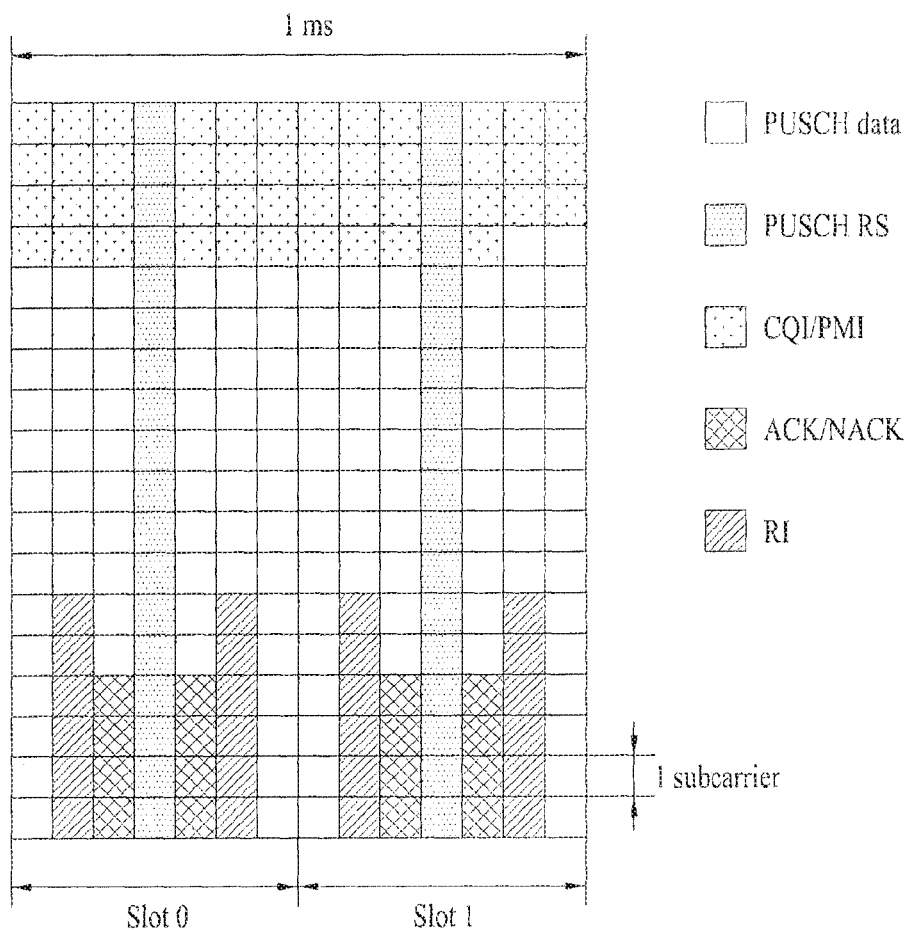
FIG. 11 illustrates multiplexing of uplink control information and uplink data in a PUSCH (Physical Uplink Shared Channel) region.

FIG. 11 illustrates multiplexing of UCI and uplink data in a PUSCH region.

The uplink data can be transmitted in a data region of a UL subframe through a PUSCH. A UL DMRS (Demodulation Reference Signal) corresponding to an RS for demodulation of the uplink data can be transmitted with the uplink data in the data region of the UL subframe. The control region and the data region in the UL subframe are respectively called a PUCCH region and a PUSCH region.

When UCI needs to be transmitted in a subframe to which PUSCH transmission is assigned, a UE multiplexes the UCI and uplink data (referred to as PUSCH data hereinafter) prior to DFT-spreading and transmits the multiplexed UL signal over a PUSCH if simultaneous transmission of the PUSCH and a PUCCH is not allowed. The UCI includes at least one of CQI/PMI, HARQ ACK/NACK and RI. The number of REs used to transmit each of CQI/PMI, HARQ ACK/NACK and RI is based on a modulation and coding scheme (MCS) and an offset value ($\Delta_{offset}^{CQI}$, $\Delta_{offset}^{HARQ-ACk}$, $\Delta_{offset}^{RI}$) allocated for PUSCH transmission. The offset value allows different coding rates according to UCI and is semi-statically set through higher layer (e.g. radio resource control (RRC)) signaling. The PUSCH data and UCI are not mapped to the same RE. The UCI is mapped such that it is present in both slots of the subframe.

Referring to FIG. 11, CQI and/or PMI resource is located at the start of the PUSCH data, sequentially mapped to all SC-FDMA symbols in one subcarrier and then mapped to the next subcarrier. The CQI/PMI is mapped to a subcarrier from the left to the right, that is, in a direction in which the SC-FDMA symbols index increases. The PUSCH data is rate-matched in consideration of the quantity of a CQI/PMI resource (that is, the number of coded symbols). The same modulation order as that of UL-SCH data is used for the CQI/PMI. ACK/NACK is inserted into part of SC-FDMA resource to which the UL-SCH data is mapped through puncturing. The ACK/NACK is located beside a PUSCH RS for demodulation of the PUSCH data and sequentially occupies corresponding SC-FDMA symbols from bottom to top, that is, in a direction in which the subcarrier index increases. In a normal CP case, SC-FDMA symbols for the ACK/NACK correspond to SC-FDMA symbols #2/#5 in each slot, as shown in FIG. 11. Coded RI is located beside a symbol for ACK/NACK irrespective of whether the ACK/NACK is actually transmitted in the subframe.

In 3GPP LTE, UCI may be scheduled such that it is transmitted over a PUSCH without PUSCH data. Multiplexing ACK/NACK, RI and CQI/PMI is similar to that illustrated in FIG. 11. Channel coding and rate matching for control signaling without PUSCH data correspond to those for the above-described control signaling having PUSCH data.

In FIG. 11, the PUSCH RS can be used to demodulate the UCI and/or the PUSCH data transmitted in the PUSCH region. In the present invention, a UL RS related to PUCCH transmission and a PUSCH RS related to PUSCH transmission are commonly called a DMRS.

A sounding reference signal (SRS) (not shown) may be allocated to the PUSCH region. The SRS is a UL RS that is not related to transmission of a PUSCH or PUCCH. The SRS is transmitted on the last SC-FDMA symbol of a UL subframe in the time domain and transmitted in a data transmission band of the UL subframe, that is, a PUSCH region in the frequency domain. An eNB can measure an uplink channel state between a UE and the eNB using the SRS. SRSs of a plurality of UEs, which are transmitted/received on the last SC-FDMA symbol of the same subframe, can be discriminated according to frequency positions/sequences thereof.

Uplink Reference Signal

A DMRS transmitted in a PUCCH region and a DMRS and an SRS transmitted in a PUSCH region can be regarded as uplink UE-specific RSs because they are UE-specifically generated by a specific UE and transmitted to an eNB.

A UL RS is defined by a cyclic shift of a base sequence according to a predetermined rule. For example, an RS sequence $r_{u,v}^{(\alpha)}(n)$ is defined by a cyclic shift $\alpha$ of a base sequence $r_{u,v}(n)$ according to the following equation.

$$r_{u,v}^{(\alpha)}(n)=e^{j\alpha n} \cdot r_{u,v}(n),\ 0 \leq n < M_{sc}^{RS} \quad \text{[Equation 1]}$$

Here, $M_{sc}^{RS}$ is the length of the RS sequence, $M_{sc}^{RS}=m \cdot M_{sc}^{RB}$ and $1 \leq m \leq N_{RB}^{max,UL}$. $N_{RB}^{max,UL}$ represented by a multiple of $N_{sc}^{RB}$ refers to a widest uplink bandwidth configuration. $N_{sc}^{RB}$ denotes the size of an RB and is represented by the number of subcarriers. A plurality of RS sequences can be defined from a base sequence through different cyclic shift values $\alpha$. A plurality of base sequences is defined for a DMRS and an SRS. For example, the base sequences are defined using a root Zadoff-Chu sequence. Base sequences $r_{u,v}(n)$ are divided into two groups each of which includes one or more base sequences. For example, each base sequence group can include one base sequence having a length of $M_{sc}^{RS}=m \cdot N^{RB}$ ($1 \leq m \leq 5$) and two base sequences having a length of $M_{sc}^{RS} m \cdot N_{sc}^{RB}$ ($6 \leq m \leq N_{sc}^{RB}$). As to $r_{u,v}(n)$, $u \in \{0, 1, \ldots, 29\}$ denotes a group number (that is, group index) and v denotes a base sequence number (that is, base sequence index) in the corresponding group. Each base sequence group number and a base sequence number in the corresponding group may be varied with time.

The sequence group number u in a slot $n_s$ is defined by a group hopping pattern $f_{gh}(n_s)$ and a sequence shift pattern f according to the following equation.

$$u=(f_{gh}(n_s)+f_{ss}) \mod 30 \quad \text{[Equation 2]}$$

In Equation 2, mod refers to a modulo operation. A mod B means a remainder obtained by dividing A by B.

A plurality of different hopping patterns (e.g. 30 hopping patterns) and a plurality of different sequence shift patterns (e.g. 17 sequence shift patterns) are present. Sequence group hopping may be enabled or disabled according to a cell-specific parameter provided by a higher layer.

The group hopping pattern $f_{gh}(n)$ can be provided by a PUSCH and a PUCCH according to the following equation.

$$f_{gh}(n_s) = \begin{cases} 0 & \text{if group hopping is disabled} \\ \left(\sum_{i=0}^{7} c(8n_s + i) \cdot 2^i\right) \mod 30 & \text{if group hopping is enabled} \end{cases} \quad \text{[Equation 3]}$$

Here, a pseudo-random sequence c(i) can be defined by a length-31 Gold sequence. An output sequence c(n) (n=0, 1, ..., $M_{PN}$−1) having a length of $M_{PN}$ is defined according to the following equation.

$$c(n)=(x_1(n+N_C)+x_2(n+N_C)) \mod 2$$

$$x_1(n+31)=(x_1(n+3)+x_1(n)) \mod 2$$

$$x_2(n+31)=(x_2(n+3)+x_2(n+2)+x_2(n+1)+x_2(n)) \mod 2 \quad \text{[Equation 4]}$$

Here, $N_C=1600$ and the first m-sequence is initialized to $x_1(0)=1, x_1(n)=0, n=1, 2, \ldots, 30$. Initialization of the second m-sequence is represented by the following equation having a value depending on application of the sequence.

$$c_{init}=\sum_{i=0}^{30} x_2(i) \cdot 2^i \quad \text{[Equation 5]}$$

In Equation 3, a pseudo-random sequence generator is initialized to $c_{init}$ at the start of each radio frame according to the following equation.

$$c_{init} = \left\lfloor \frac{N_{ID}^{cell}}{30} \right\rfloor \quad \text{[Equation 6]}$$

In Equation 6, $\lfloor \ \rfloor$ denotes floor operation and $\lfloor A \rfloor$ is a maximum integer less than or equal to A.

According to 3GPP LTE, a PUCCH and a PUSCH have different sequence shift patterns although they have the same group hopping pattern according to Equation 3. A sequence shift pattern $f_{ss}^{PUCCH}$ for the PUCCH is provided on the basis of cell identification information (cell ID) according to the following equation.

$$f_{ss}^{PUCCH}=N_{ID}^{cell} \mod 30 \quad \text{[Equation 7]}$$

A sequence shift pattern $f_{ss}^{PUSCH}$ for the PUSCH is given according to the following equation using the sequence shift pattern $f_{ss}^{PUCCH}$ for the PUCCH and a value $\Delta_{ss}$ configured by a higher layer.

$$f_{ss}^{PUSCH}=(f_{ss}^{PUCCH}+\Delta_{ss}) \mod 30 \quad \text{[Equation 8]}$$

Here, $\Delta_{ss} \in \{0, 1, \ldots, 29\}$.

Base sequence hopping is applied only to RSs having a length of $M_{sc}^{RS} \geq 6N_{sc}^{RB}$. For RSs having a length of $M_{sc}^{RS} \geq 6N^{RB}$, the base sequence number v in a base sequence group is 0. For RSs having a length of $M_{sc}^{RS} > 6N^{RB}$, the base sequence number v in a base sequence group in the slot $n_s$ is defined as $v=c(n_s)$ when group hopping is disabled and sequence hopping is enabled and defined as v=0 in other cases. Here, the pseudo-random sequence c(i) is given by Equation 4. The pseudo-random sequence generator is initialized to $c_{init}$ at the start of each radio frame according to the following equation.

$$c_{init} = \left\lfloor \frac{N_{ID}^{cell}}{30} \right\rfloor \cdot 2^5 + f_{ss}^{PUSCH} \quad \text{[Equation 9]}$$

A sequence $r_{PUCCH}^{(p)}(\cdot)$ of the UL RS (PUCCH DMRS) in FIGS. 6 to 10 is given by the following equation.

$$r_{PUCCH}^{(p)}(m'N_{RS}^{PUCCH}M_{sc}^{RS} + mM_{sc}^{RS} + n) = \quad \text{[Equation 10]}$$

$$\frac{1}{\sqrt{P}} \bar{w}^{(p)}(m)z(m)r_{u,v}^{(\alpha\_p)}(n)$$

Here, m=0, ..., $N_{RS}^{PUCCH}$−1, n=0, ..., $M_{sc}^{RS}$−1, and m'=0, 1. $N_{RS}^{PUCCH}$ denotes the number of reference symbols per slot for the PUCCH and P denotes the number of antenna ports used for PUCCH transmission. A sequence $r_{u,v}^{(\alpha\_p)}(n)$ is given by Equation 1 having $M_{sc}^{RS}=12$, and a cyclic shift $\alpha\_p$ is determined by a PUCCH format.

All PUCCH formats use a cell-specific CS, $n_{cs}^{cell}(n_s,l)$ which has a value depending on a symbol number l and a slot number $n_s$ and is determined as $n_{cs}^{cell}(n_s, l)=\sum_{i=0}^{7} c$ $(8N_{symb}^{UL} \cdot n_s + 8l + i) \cdot 2^i$. Here, the pseudo-random sequence c(i) is initialized at the start of each radio frame according to $c_{init} = N_{ID}^{cell}$.

As to PUCCH formats 2a and 2B, z(m) corresponds to d(10) when m=1, and z(m)=1 in other cases. For PUCCH formats 2a and 2b supported for only the normal CP, UCI bits $b(20), \ldots, b(M_{bit}-1)$ from among $b(0), \ldots, b(M_{bit}-1)$ are modulated into a single modulation symbol d(10) used to generate a reference signal for PUCCH formats 2a and 2b, as shown in Table 1.

TABLE 1

| PUCCH format | $b(20), \ldots, b(M_{bit}-1)$ | d(10) |
|---|---|---|
| 2a | 0 | 1 |
|  | 1 | −1 |
| 2b | 00 | 1 |
|  | 01 | −j |
|  | 10 | j |
|  | 11 | −1 |

The PUSCH RS (referred to as PUSCH DMRS hereinafter) in FIG. 11 is transmitted on a layer basis. A PUSCH DMRS sequence $r_{PUSCH}^{(\tilde{p})}(\cdot)$ related to layer $\lambda \in \{0, 1, \ldots, \upsilon-1\}$ is given by the following equation.

$$r_{PUSCH}^{(\lambda)}(m \cdot M_{sc}^{RS} + n) = w^{(\lambda)}(m) r_{u,v}^{(\alpha\_\lambda)}(n) \quad \text{[Equation 11]}$$

Here, $m=0, 1, n=0, \ldots, M_{sc}^{RS}-1$, and $M_{sc}^{RS} = M_{sc}^{PUSCH}$. $M_{sc}^{PUSCH}$ is a bandwidth scheduled for uplink transmission and denotes the number of subcarriers. An orthogonal sequence $w(\lambda)(m)$ can be given by Table 2 using a cyclic shift field in latest uplink-related DCI for transport blocks related to the corresponding PUSCH. Table 2 illustrates mapping of a cyclic shift field in an uplink-related DCI format to $n_{DMRS,\lambda}^{(2)}$ and $[w^{(\lambda)}(0) \ w^{(\lambda)}(1)]$.

TABLE 2

| Cyclic Shift Field in uplink-related DCI format | $n_{DMRS,\lambda}^{(2)}$ | | | | $[w^{(\lambda)}(0) \ w^{(\lambda)}(1)]$ | | | |
|---|---|---|---|---|---|---|---|---|
|  | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

A cyclic shift $\alpha\_\lambda$ in the slot $n_s$ is given as $2\pi n_{cs,\lambda}/12$. Here, $n_{cs,\lambda} = (n_{DMRS}^{(1)} + n_{DMRS,\lambda}^{(2)} + n_{PN}(n_s)) \bmod 12$ where $n_{DMRS}^{(1)}$ is given by Table 3 according to a cyclic shift parameter provided through higher layer signaling. Table 3 shows mapping of cyclic shifts to $n_{DMRS}^{(1)}$ according to higher layer signaling.

TABLE 3

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |

TABLE 3-continued

| cyclicShift | $n_{DMRS}^{(1)}$ |
|---|---|
| 6 | 9 |
| 7 | 10 |

Furthermore, $n_{PN}(n_s)$ is given by the following equation using the cell-specific pseudo-random sequence c(i).

$$n_{PN}(n_s) = \sum_{i=0}^{7} c(8N_{symb}^{UL} \cdot n_s + i) \cdot 2^i \quad \text{[Equation 12]}$$

Here, the pseudo-random sequence c(i) is defined by Equation 4. The pseudo-random sequence generator is initialized to $c_{init}$ at the start of each radio frame according to the following equation.

$$c_{init} = \left\lfloor \frac{N_{ID}^{cell}}{30} \right\rfloor \cdot 2^5 + f_{ss}^{PUSCH} \quad \text{[Equation 13]}$$

An SRS sequence $r_{SRS}^{(p)}(n) = r_{u,v}^{(\alpha\_p)}(n)$ is defined by Equation 1. Here, u denotes the PUCCH sequence group number above-described with respect to group hopping and v denotes the base sequence number above-described with respect to sequence hopping. The cyclic shift $\alpha\_p$ of the SRS is given as follows.

$$\alpha_p = 2\pi \frac{n_{SRS}^{cs,p}}{8} \quad \text{[Equation 14]}$$

$$n_{SRS}^{cs,p} = \left( n_{SRS}^{cs} + \frac{8p}{N_{ap}} \right) \bmod 8$$

$$p \in \{0, 1, \ldots, N_{ap} - 1\}$$

Here, $n_{SRS}^{cs} = \{0, 1, 2, 3, 4, 5, 6, 7\}$ is a value configured for each UE by higher layer parameters and separately generated by different higher layer parameters for configurations of periodic sounding and non-periodic sounding. $N_{ap}$ denotes the number of antenna ports used for SRS transmission.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells.

Basically, a communication scheme of MIMO using multiple antennas can be applied to CoMP.

Enhanced Uplink Signal Transmission Scheme

Referring to Equations 1 to 14, UEs located in a cell initialize the pseudo-random sequence generator that generates RS sequences using the same $N_{ID}^{cell}$. Because a UE transmits an uplink signal only to one cell, the UE uses only one $N_{ID}^{cell}$ in order to generate a PUSCH DMRS, PUCCH DMRS and SRS. That is, in a conventional system in which a UE transmits an uplink signal only to one cell, a UE based DMRS sequence is used. In other words, since the conventional communication system performs uplink transmission only for one cell, a UE can acquire $N_{ID}^{cell}$ (i.e. physical layer cell ID) on the basis of a downlink PSS (Primary Synchronization Signal) received from the serving cell and use the acquired $N_{ID}^{cell}$ to generate an uplink RS sequence.

However, in uplink CoMP, a UE can transmit an uplink signal to a plurality of cells or reception points (RPs) or to some of the cells or RPs. In this case, when an uplink transmitting side transmits an RS sequence generated according to a conventional method, a receiving side may not detect the RS.

Accordingly, for CoMP in which a plurality of cells or RPs participates in communication with a UE, it is necessary to define DMRS generation, resource allocation and/or transmission schemes for data transmitted to different points even if the different points do not simultaneously receive the data. While one RP can receive an uplink signal from a UE through one or more cells, a cell receiving an uplink signal is called an RP in the following description for convenience.

The present invention proposes a method by which a CoMP UE generates a DMRS sequence used for PUSCH transmission and/or PUCCH transmission in a multi-cell (multi-RP) environment.

Figure 12:
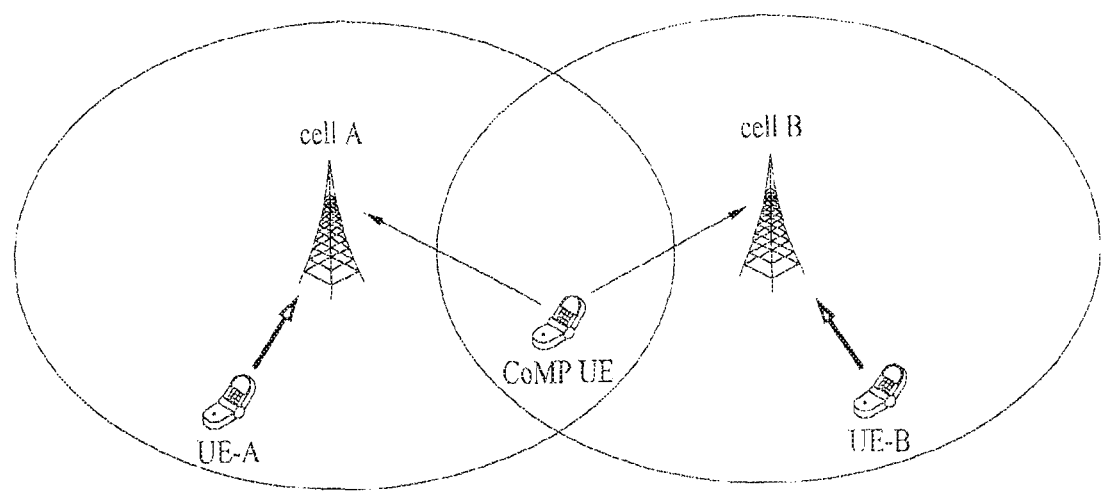
FIG. 12 illustrates an exemplary UL CoMP operation.

FIG. 12 is a diagram for explaining an exemplary UL CoMP operation.

In an uplink CoMP operation by which one UE (i.e. CoMP UE) transmits a PUSCH to a plurality of cells (or RPs), it is important to ensure mutual orthogonality between uplink DMRSs. If mutual orthogonality between uplink DMRSs is not ensured, each RP cannot correctly estimate an uplink channel, and thus PUSCH demodulation performance is considerably deteriorated. The UE can generate a DMRS base sequence using the cell ID of a serving cell and apply an OCC for orthogonality with other DMRSs as necessary. Specifically, the uplink DMRS base sequence is a function of the cell ID, and a PUSCH DMRS base sequence index having an offset of $\Delta_{ss}$ from a PUCCH DMRS base sequence index is determined. Here, $\Delta_{ss}$ is given through higher layer signaling (e.g. RRC signaling). That is, the same cell ID is applied to generation of base sequences of PUCCH DMRS and PUSCH DMRS and a base sequence index offset of $\Delta_{ss}$ is provided between the base sequences of PUCCH DMRS and PUSCH DMRS (refer to Equation 8). For example, if $\Delta_{ss}=0$ is signaled through RRC signaling, the PUCCH DMRS and PUSCH DMRS may have the same base sequence.

In case of the CoMP UE, a DL serving cell and a UL serving cell may be different from each other, and thus the cell ID of the DL serving cell cannot be used to generate a UL DMRS base sequence and the UL DMRS base sequence needs to be generated using the cell ID of an RP according to determination by a scheduler. That is, the UL DMRS base sequence needs to be generated using the ID of a cell other than the serving cell. To provide scheduling flexibility in determination of UEs paired for MU-MIMO, it is desirable to dynamically indicate a cell ID used to generate a UL DMRS. For example, a higher layer can signal setting of a plurality of DMRSs (including setting of a DMRS for cell A and setting of a DMRS for cell B) to a CoMP UE located at edges of a cell A and a cell B shown in FIG. 12. The CoMP UE may be co-scheduled with another UE (UE-A) of the cell A or another UE (UE-B) of the cell B according to channel condition and/or other network conditions. That is, a DMRS base sequence of the CoMP UE can be generated using the ID of a cell to which a UE co-scheduled with the CoMP UE belongs. The cell ID used for DMRS base sequence generation can be dynamically selected or indicated.

To support the above-described uplink CoMP operation, the present invention can provide a cell ID to be used to generate a PUSCH DMRS sequence to a UE through UE-specific higher layer signaling (e.g. RRC signaling). The cell ID used to generate the PUSCH DMRS sequence can be indicated using a parameter such as $N_{ID}^{(PUSCH)}$ or $n_{ID}^{(PUSCH)}$ to be discriminated from a cell ID (that is, a parameter $N_{ID}^{cell}$ representing a physical layer cell ID (PCI)) used to generate a conventional DMRS sequence. Here, $N_{ID}^{(PUSCH)}$ or $n_{ID}^{(PUSCH)}$ may be called a virtual cell ID (VCI) for PUSCH DMRS sequence generation. The virtual cell ID (referred to as "PUSCH DMRS VCI") for PUSCH DMRS sequence generation may have a value identical to or different from the PCI.

According to the conventional operation, a sequence shift pattern $f_{ss}^{PUSCH}$ for the PUSCH DMRS is determined using a sequence shift pattern $f_{ss}^{PUCCH}$ for the PUCCH and the sequence shift related offset $\Delta_{ss}$ set by a higher layer (refer to Equations 7 and 8). When $f_{ss}^{PUCCH}$ of Equation 7 is applied to Equation 8, the following equation 15 is obtained.

$$f_{ss}^{PUSCH}=(N_{ID}^{cell} \bmod 30)+\Delta_{ss}) \bmod 30=(N_{ID}^{cell}+\Delta_{ss}) \bmod 30 \quad \text{[Equation 15]}$$

When use of the PUSCH DMRS VCI parameter (e.g. $N_{ID}^{(PUSCH)}$ or $n_{ID}^{(PUSCH)}$) is set by a higher layer, the offset $\Delta_{ss}$ set by the higher layer may be used in the present invention. This may be called a first scheme for setting $\Delta_{ss}$.

Furthermore, when use of the PUSCH DMRS VCI parameter (e.g. $N_{ID}^{(PUSCH)}$ or $n_{ID}^{(PUSCH)}$) is set by the higher layer, the present invention may generate a PUSCH DMRS sequence using a predetermined (or pre-appointed) specific offset value $\Delta_{ss}$ instead of the offset $\Delta_{ss}$ set by the higher layer. That is, when the higher layer signals the PUSCH DMRS VCI parameter (e.g. $N_{ID}^{(PUSCH)}$ or $n_{ID}^{(PUSCH)}$) to a UE, the UE can be configured to use the predetermined offset $\Delta_{ss}$ instead of the offset $\Delta_{ss}$ previously used by the UE (or set by the higher layer). This may be called a second scheme for setting $\Delta_{ss}$.

As an example of the second scheme for setting $\Delta_{ss}$, the present invention may previously determine a rule such that operation is performed on the basis of $\Delta_{ss}=0$ when the higher layer sets use of the PUSCH DMRS VCI parameter $N_{ID}^{(PUSCH)}$ or $n_{ID}^{(PUSCH)}$. This may be called a third scheme for setting $\Delta_{ss}$.

For example, the PUSCH DMRS VCI parameter $N_{ID}^{(PUSCH)}$ or $n_{ID}^{(PUSCH)}$ can replace the physical cell ID parameter $N_{ID}^{cell}$ and $\Delta_{ss}$ can be set to 0 in Equation 15. This is arranged as follows.

$$f_{ss}^{PUSCH}=N_{ID}^{(PUSCH)} \bmod 30 \text{ or}$$

$$f_{ss}^{PUSCH}=n_{ID}^{(PUSCH)} \bmod 30 \quad \text{[Equation 16]}$$

A plurality of PUSCH DMRS VCI values $N_{ID}^{(PUSCH)}$ or $n_{ID}^{(PUSCH)}$ may be set the higher layer and a value to be used from among the plurality of PUSCH DMRS VCI values $N_{ID}^{(PUSCH)}$ or $n_{ID}^{(PUSCH)}$ may be dynamically indicated through uplink scheduling grant information (that is, uplink-related DCI). Here, when the PUSCH DMRS VCI values $N_{ID}^{(PUSCH)}$ or $n_{ID}^{(PUSCH)}$ are set by the higher layer, specific values respectively mapped to the PUSCH DMRS VCI values may be used.

To dynamically indicate one of the PUSCH DMRS VCI values $N_{ID}^{(PUSCH)}$ or $n_{ID}^{(PUSCH)}$ through the uplink-related DCI, a bit (or bits) for indicating a virtual cell ID may be newly added to the uplink-related DCI format to explicitly indicate the corresponding VCI or an existing bit (or bits) may be reused. For example, a mapping relationship can be established such that one of states of a 3-bit "Carrier Indicator" field or a 3-bit "Cyclic Shift for DMRS and OCC index" field from among bit fields of the uplink-related DCI (e.g. DCI format 0 or 4) implicitly indicates one of the PUSCH DMRS VCI values $N_{ID}^{(PUSCH)}$ or $n_{ID}^{(PUSCH)}$.

A case in which the PUSCH DMRS VCI $N_{ID}^{(PUSCH)}$ or $n_{ID}^{(PUSCH)}$ is set by the higher layer has been described in the above embodiment. The present invention proposes a scheme for setting/providing a virtual cell ID (referred to as "PUCCH DMRS VCI") used to generate a PUCCH DMRS sequence through UE-specific higher layer signaling (e.g. RRC signaling). A PUCCH DMRS VCI parameter may be indicated by $N_{ID}^{(PUSCH)}$ or $n_{ID}^{(PUSCH)}$.

While the same cell ID (i.e. physical cell ID parameter $N_{ID}^{cell}$) is used to generate a PUSCH DMRS sequence and a PUCCH DMRS sequence in conventional operations, the present invention proposes a scheme of separately (independently) setting the PUSCH DMRS VCI (that is, $N_{ID}^{(PUSCH)}$ or $n_{ID}^{(PUSCH)}$) and the PUCCH DMRS VCI (that is, $N_{ID}^{(PUCCH)}$ or $n_{ID}^{(PUCCH)}$).

For simplicity, the PUSCH DMRS VCI and the PUCCH DMRS VCI may be represented as one parameter $n_{ID}^{RS}$. In this case, $n_{ID}^{RS}$ can be determined according to transmission type. That is, $n_{ID}^{RS}$ can be defined as $n_{ID}^{(PUSCH)}$ in case of PUSCH related transmission and $n_{ID}^{RS}$ can be defined as $n_{ID}^{(PUCCH)}$ in case of PUCCH related transmission. Here, while one parameter $n_{ID}^{RS}$ is used, $n_{ID}^{(PUSCH)}$ (or $N_{ID}^{(PUSCH)}$) and $n_{ID}^{(PUCCH)}$ (or $n_{ID}^{(PUCCH)}$) are defined as separate parameters. That is, it should be understood that $n_{ID}^{(PUSCH)}$ (or $N_{ID}^{(PUSCH)}$ and $n_{ID}^{(PUCCH)}$ (or $n_{ID}^{(PUCCH)}$) can be set by a higher layer as separate parameters.

A case in which a PUCCH related VCI (that is, $n_{ID}^{(PUCCH)}$ or $N_{ID}^{(PUCCH)}$) and a PUSCH related VCI (that is, $n_{ID}^{(PUCCH)}$ or $N_{ID}^{(PUCCH)}$) are different from each other may represent that a UE respectively transmits a PUCCH and a PUSCH to different RPs. That is, the PUCCH may be transmitted to an RP (or RPs) corresponding to, $n_{ID}^{(PUCCH)}$ or $N_{ID}^{(PUCCH)}$ and the PUSCH may be transmitted to an RP (or RPs) corresponding to $n_{ID}^{(PUCCH)}$ or $N_{ID}^{(PUCCH)}$.

A plurality of PUCCH DMRS VCI values $N_{ID}^{(PUCCH)}$ or $n_{ID}^{(PUCCH)}$ may be set by the higher layer and a value to be used from among the plurality of PUCCH DMRS VCI values $N_{ID}^{(PUCCH)}$ or $n_{ID}^{(PUCCH)}$ may be dynamically indicated through uplink-related DCI. To dynamically indicate one of the PUCCH DMRS VCI values, a method of implicitly indicating a PUCCH DMRS VCI through a state of a specific bit field of an uplink-related DCI format or a method of adding a new bit field (or bit fields) to explicitly indicate a PUCCH DMRS DCI may be used. For example, a mapping relationship can be established such that one of states of "HARQ process number" field (which is defined as 3 bits in case of FDD and 4 bits in case of TDD) of an uplink-related DCI format (e.g. DCI format 0 or 4) implicitly indicates one of the PUCCH DMRS VCI values. Otherwise, a mapping relationship can be established such that one of states of a bit field (e.g. downlink DMRS sequence generation can be performed using a scrambling ID value indicated by 3-bit "Antenna port(s), scrambling identity and number of layers" field), which indicates a downlink DMRS (or UE-specific RS) parameter in DCI (e.g. DCI format 2C) for downlink allocation, implicitly indicates one of the PUCCH DMRS VCI values.

The above-described embodiment of the present invention is represented by equations as follows.

When the pseudo-random sequence c(i) used to determine the group hopping pattern $f_{gh}(n_s)$ of an uplink DMRS is generated according to Equations 3 and 6, the present invention can initialize the pseudo-random sequence generator to $c_{init}$ at the start of each radio frame according to the following equation. That is, Equation 6 can be replaced by Equation 17.

$$c_{init} = \left\lfloor \frac{N_{ID}^{RS}}{30} \right\rfloor \quad \text{[Equation 17]}$$

where $n_{ID}^{RS}=n_{ID}^{(PUSCH)}$ or $n_{ID}^{RS}=N_{ID}^{(PUSCH)}$ for a PUSCH, and $n_{IS}^{RS}=n_{ID}^{(PUCCH)}$ or $n_{ID}^{RS}=N_{ID}^{(PUCCH)}$ for a PUCCH.

Equation 17 may be represented as Equation 18.

$$c_{init} = \left\lfloor \frac{N_{ID}^{(PUSCH)}}{30} \right\rfloor \text{ or } c_{init} = \left\lfloor \frac{n_{ID}^{(PUSCH)}}{30} \right\rfloor \text{ for } PUSCH, \text{ and}$$

$$c_{init} = \left\lfloor \frac{N_{ID}^{(PUCCH)}}{30} \right\rfloor \text{ or } c_{init} = \left\lfloor \frac{n_{ID}^{(PUCCH)}}{30} \right\rfloor \text{ for } PUCCH \quad \text{[Equation 18]}$$

The sequence shift parameter $f_{ss}^{PUCCH}$ for PUCCH DMRS can be represented by the following equation.

$$f_{ss}^{PUCCH}=n_{ID}^{RS} \bmod 30 \quad \text{[Equation 19]}$$

where $n_{ID}^{RS}=n_{ID}^{(PUSCH)}$ or $n_{ID}^{RS}=N_{ID}^{(PUSCH)}$ for a PUCCH.

Equation 19 may be represented as Equation 20.

$$f_{ss}^{PUCCH}=N_{ID}^{(PUCCH)} \bmod 30 \text{ or } f_{ss}^{PUCCH}=n_{ID}^{(PUCCH)} \bmod 30$$

When the sequence shift parameter $f_{ss}^{PUSCH}$ for, PUSCH DMRS is determined, $f_{ss}^{PUSCH}$ can be represented by Equation 21 when $\Delta_{ss}$ is predefined as 0 as represented by Equation 16.

$$f_{ss}^{PUSCH}=n_{ID}^{RS} \bmod 30 \quad \text{[Equation 21]}$$

where $n_{ID}^{RS}=n_{ID}^{(PUSCH)}$ or $n_{ID}^{RS}=N_{ID}^{(PUSCH)}$ for a PUSCH.

Equation 21 may be represented as Equation 16 (that is, $f_{ss}^{PUSCH}=N_{ID}^{(PUSCH)} \bmod 30$ or $f_{ss}^{PUSCH}=n_{ID}^{(PUSCH)} \bmod 30$).

Here, it should be noted that $n_{ID}^{(PUSCH)}$ (or $N_{ID}^{(PUSCH)}$) and $n_{ID}^{(PUCCH)}$ (or $n_{ID}^{(PUCCH)}$), which are different from each other, are actually applied as VCI values (i.e. $n_{ID}^{RS}$) although $f_{ss}^{PUCCH}$ and $f_{ss}^{PUSCH}$ are defined in the same equation form in Equations 19 and 21.

When the scheme (the third scheme for setting $\Delta_{ss}$) represented by Equation 21 is applied, even if a value $\Delta_{ss}$ set through higher layer signaling has been provided to a corresponding UE, $f_{ss}^{PUSCH}$ is calculated by setting $\Delta_{ss}$ to 0 when the PUSCH VCI (i.e. $n_{ID}^{(PUSCH)}$ or $N_{ID}^{(PUSCH)}$) is set by higher layer signaling.

Alternatively, in determination of the sequence shift parameter $f_{ss}^{PUSCH}$ for PUSCH DMRS, $f_{ss}^{PUSCH}$ can be represented by Equation 22 when the value $\Delta_{ss}$ set by the higher layer is used (that is, the first scheme for setting $\Delta_{ss}$) or a predetermined specific value $\Delta_{ss}$ is used (that is, the second scheme for setting $\Delta_{ss}$).

$$f_{ss}^{PUSCH}=\{(n_{ID}^{RS} \bmod 30)+\Delta_{ss}\} \bmod 30 \quad \text{[Equation 22]}$$

where $n_{ID}^{RS}=n_{ID}^{(PUSCH)}$ or $n_{ID}^{RS}=N_{ID}^{(PUSCH)}$ for PUSCH.

In Equation 22, $\Delta_{ss} \in \{0, 1, \ldots, 29\}$.

Equation 22 may be represented as the following equation.

$$f_{ss}^{PUSCH}=\{(N_{ID}^{(PUSCH)} \bmod 30)+\Delta_{ss}\} \bmod 30 \text{ or}$$

$$f_{ss}^{PUSCH}=\{(n_{ID}^{(PUSCH)} \bmod 30)+\Delta_{ss}\} \bmod 30 \quad \text{[Equation 23]}$$

According to the first scheme for setting $\Delta_{ss}$, $f_{ss}^{PUSCH}$ can be calculated using the value $\Delta_{ss}$ set by higher layer signaling and previously provided to the corresponding UE and the PUSCH VCI (that is, $n_{ID}^{(PUSCH)}$ or $N_{ID}^{(PUSCH)}$) signaled by the higher layer.

According to the second scheme for setting $\Delta_{ss}$, even if the value $\Delta_{ss}$ set by higher layer signaling has been provided to the corresponding UE, $f_{ss}^{PUSCH}$ can be calculated by setting $\Delta_{ss}$ to a specific value s ($s \in \{0, 1, \ldots, 29\}$) when the PUSCH VCI (that is, $n_{ID}^{PUSCH}$) or $N_{ID}^{(PUSCH)}$) is set through higher layer signaling.

According to the above-described embodiments, a group hopping pattern $f_{gh}(n_s)$ of a UE for which a value A is set by a higher layer as a PUSCH DMRS VCI (that is, $n_{ID}^{(PUSCH)}$ or $N_{ID}^{(PUSCH)}$) corresponds to group hopping patterns of other UEs (that is UEs for which a PCI is set to A and/or UEs for which a PUSCH VCI is set to A) using the value A as a cell ID. Furthermore, when the same $\Delta_{ss}$ (particularly, $\Delta_{ss}=0$) is applied to determination of the sequence shift pattern $f_{ss}^{PUSCH}$, the sequence shift pattern of the UE for which the PUSCH VCI is set corresponds to PUSCH DMRS sequence shift patterns of the other UEs. Accordingly, base sequence indexes u of UEs which use the same group hopping pattern and the same sequence shift pattern are identical (refer to Equation 2). This means that orthogonality can be given between DMRSs of the UEs by respectively applying different CSs to the UEs. That is, the present invention can provide orthogonality between PUSCH DMRSs of UEs belonging to different cells by setting a PUSCH DMRS VCI for a specific UE, distinguished from a conventional wireless communication system in which orthogonality between PUSCH DMRSs is given using different CSs in the same cell. Accordingly, MU-MIMO pairing for UEs belonging to different cells can be achieved and enhanced UL CoMP operation can be supported.

Furthermore, even when different PUSCH DMRS VCI values are set for a plurality of UEs, orthogonality between PUSCH DMRSs can be provided by making the plurality or UEs use the same PUSCH DMRS base sequence.

Specifically, the first, second and third schemes for setting $\Delta_{ss}$ correspond to a rule of determining a value $\Delta_{ss}$ to be used when the PUSCH DMRS VCI (that is, $n_{ID}^{(PUSCH)}$ or $N_{ID}^{(PUSCH)}$) is signaled by a higher layer. On the assumption that one of the schemes is applied, an eNB can select an appropriate PUSCH DMRS VCI (that is, $n_{ID}^{(PUSCH)}$ or $N_{ID}^{(PUSCH)}$) in consideration of a value $\Delta_{ss}$ to be used and signal the selected PUSCH DMRS VCI to a UE. Here, $c_{init}$, which is a factor (or a seed value) for determining the group hopping pattern $f_{gh}(n)$, is determined as the same value for 30 different VCI values (that is, $n_{ID}^{(PUSCH)}$ or $N_{ID}^{(PUSCH)}$ according to a floor operation as represented by Equations 17 and 18. Accordingly, it is possible to set $f_{ss}^{PUSCH}$ to a specific value by selecting an appropriate one of the 30 different VCI values generating the same group hopping pattern $f_{gh}(n_s)$. That is, group hopping patterns $f_{gh}(n_s)$ respectively calculated by two different UEs can be identical to each other even though different VCIs are set for the two UEs. Furthermore, sequence shift patterns $f_{ss}^{PUSCH}$ respectively calculated by the two UEs can be identical to each other.

An appropriate VCI (that is, $n_{ID}^{(PUSCH)}$ or $N_{ID}^{(PUSCH)}$) that makes group hopping patterns $f_{gh}(n_s)$ and sequence shift patterns $f_{ss}^{PUSCH}$ of MU-MIMO-paired UEs correspond to each other can be set through a higher layer. Accordingly, PUSCH DMRS base sequences of the UEs become identical, and thus orthogonality between PUSCH DMRSs can be provided according to a method of applying different CSs to the UEs.

In addition, a plurality of UEs can have the same group hopping pattern $f_{gh}(n_s)$ and/or the same sequence shift pattern $f_{ss}^{PUSCH}$ through a method of setting a UE-specific VCI (that is, $n_{ID}^{(PUSCH)}$ or $N_{ID}^{(PUSCH)}$) and/or a method of setting a UE-specific $\Delta_{ss}$. Here, since a method of additionally higher-layer-signaling a value $\Delta_{ss}$ to each UE may generate unnecessary overhead, it is possible to make the UEs have the same group hopping pattern $f_{gh}(n_s)$ and the same sequence shift pattern $f_{ss}^{PUSCH}$ by signaling only the UE-specific VCI without separately signaling $\Delta_{ss}$.

Alternatively, the PUSCH transmission related VCI (that is, $n_{ID}^{(PUSCH)}$ or $N_{ID}^{(PUSCH)}$) may be used only when $f_{ss}^{PUSCH}$ is determined. That is, the PCI (that is, $N_{ID}^{cell}$) of the current serving cell is used for $f_{ss}^{PUCCH}$, as represented by Equation 7, and the VCI (that is, $n_{ID}^{(PUSCH)}$ or $N_{ID}^{(PUSCH)}$) proposed by the present invention is used for $f_{ss}^{PUSCH}$ to separate a PUCCH sequence and a PUSCH sequence from each other.

Alternatively, $N_{ID}^{(PUSCH)}$ may also be applied to $f_{ss}^{PUCCH}$. That is $f_{ss}^{PUCCH}$ can be defined by Equation 24.

$$f_{ss}^{PUCCH} = N_{ID}^{(PUSCH)} \bmod 30 \text{ or } f_{ss}^{PUCCH} = n_{ID}^{(PUSCH)} \bmod 30 \quad \text{[Equation 24]}$$

Equation 24 represents that a UE-specific VCI ($N_{ID}$) is set by higher layer signaling and commonly used to determine $f_{ss}^{PUCCH}$ and $f_{ss}^{PUSCH}$. That is, a PUCCH and a PUSCH are transmitted from a corresponding UE to an RP (or RPs) using a UE-specific $N_{ID}$ by setting the UE-specific $N_{ID}$.

The scope of the present invention is not limited to the above-described embodiments and can include various methods for allowing UEs to have the same PUSCH DMRS sequence group hopping pattern $f_{gh}(n_s)$ and/or the same shift pattern $f_{ss}^{PUSCH}$ by setting a UE-specific VCI.

When group hopping is disabled and sequence hopping is enabled, sequence hopping according to a conventional method can be defined as represented by Equation 9. As proposed by the present invention, when a UE-specific VCI (that is, $n_{ID}^{(PUSCH)}$ or $N_{ID}^{(PUSCH)}$) is set by a higher layer and sequence hopping is enabled, the pseudo-random sequence generator can be initialized to $c_{init}$ at the start of each radio frame according to the following equation.

$$c_{init} = \left\lfloor \frac{n_{ID}^{RS}}{30} \right\rfloor \cdot 2^5 + f_{ss}^{PUSCH} \quad \text{[Equation 25]}$$

where $n_{ID}^{RS} = n_{ID}^{(PUSCH)}$ or $n_{ID}^{RS} = N_{ID}^{(PUSCH)}$ for a PUSCH.

The VCI (that is, $n_{ID}^{RS}$ ($n_{ID}^{RS} = n_{ID}^{(PUSCH)}$ or $n_{ID}^{RS} = N_{ID}^{(PUSCH)}$ for PUSCH transmission)) used in Equation 25 may correspond to the PUSCH DMRS VCI signaled to the UE through higher layer signaling, which is described in the other embodiments. In addition, $f_{ss}^{PUSCH}$ in Equation 25 may correspond to the value determined according to Equation 16, 21, 22 or 23 (that is, a value determined according to the first, second or third scheme for setting $\Delta_{ss}$).

Specifically, $n_{ID}^{RS}$ and $f_{ss}^{PUSCH}$ in Equation 25 can use the same values as $n_{ID}^{RS}$ and $f_{ss}^{PUSCH}$ determined to make group hopping patterns $f_{gh}(n)$ and sequence hopping patterns $f_{ss}^{PUSCH}$ set for MU-MIMO-paired UE equal to each other when the third scheme (that is, a scheme of determining $\Delta_{ss}$ as 0 without additional higher layer signaling for setting $\Delta_{ss}$) for setting $\Delta_{ss}$ is applied.

Scheme of Setting Range of Virtual Cell ID Value

As described above, the first VCI (e.g., $n_{ID}^{(PUSCH)}$ or $N_{ID}^{(PUSCH)}$) for the PUCCH DMRS and the second VCI (e.g., $n_{ID}^{(PUSCH)}$ or $N_{ID}^{(PUSCH)}$) for the PUSCH DMRS can be provided as separate parameters.

Here, the first VCI (e.g., $n_{ID}^{(PUSCH)}$ or $N_{ID}^{(PUSCH)}$) for the PUCCH DMRS can be set to one of 504 values (i.e. 0 to 503) like the PCI. In the conventional wireless communication system, the sequence shift pattern $f_{ss}^{PUCCH}$ for a PUCCH is calculated without using $\Delta_{ss}$ according to Equation 7, $f_{ss}^{PUCCH} = N_{ID}^{cell} \bmod 30$. When the first VCI (e.g. $n_{ID}^{(PUSCH)}$ or $N_{ID}^{(PUSCH)}$) for a PUCCH is set through higher layer signaling according to the present invention, $f_{ss}^{PUCCH}$ is calculated without using $\Delta_{ss}$ according to Equation 20, $f_{ss}^{PUCCH} = N_{ID}^{(PUSCH)} \bmod 30$ or $f_{ss}^{PUCCH} = n_{ID}^{(PUSCH)} \bmod 30$. Accordingly, sequence shift operation can be successfully supported even when the range of the first VCI for a PUCCH is limited to 0 to 503 as the PCI.

When the second VCI (e.g., $n_{ID}^{(PUSCH)}$ or $N_{ID}^{(PUSCH)}$) for a PUSCH has the same range as that of the PCI, sequence shift for the PUSCH DMRS cannot be successfully supported. In the conventional wireless communication system, the sequence shift pattern $f_{ss}^{PUSCH}$ for a PUSCH is calculated with using $\Delta_{ss}$ according to Equation 8, $f_{ss}^{PUCCH} = (f_{ss}^{PUCCH} + \Delta_{ss}) \bmod 30$. According to the scheme (particularly, the third scheme for setting $\Delta_{ss}$) proposed by the present invention, however, when the second VCI (e.g. $n_{ID}^{(PUSCH)}$ or $N_{ID}^{(PUSCH)}$) for a PUSCH is set, $f_{ss}^{PUSCH}$ is calculated without using $\Delta_{ss}$ according to Equation 16, $f_{ss}^{PUSCH} = N_{ID}^{(PUSCH)} \bmod 30$ or $f_{ss}^{PUSCH} = n_{ID}^{(PUSCH)} \bmod 30$. The scheme of using the PCI and $\Delta_{ss}$ in the conventional wireless communication system was employed in order to cover 30 base sequence groups and 17 sequence group hopping patterns. That is, the offset value $\Delta_{ss}$ was additionally used because all 510 (that is, 30 base sequence groups× 17 sequence group hopping patterns) cases cannot be covered when based on only the PCI since the range of the PCI is limited to 0 to 503. Accordingly, to determine $f_{ss}^{PUSCH}$ using only the second VCI for a PUSCH without using $\Delta_{ss}$, it is necessary to correct the range of the second VCI (e.g. $n_{ID}^{(PUSCH)}$ or $N_{ID}^{(PUSCH)}$).

Therefore, the present invention defines the range of the value of the second VCI (e.g. $n_{ID}^{(PUSCH)}$ or $N_{ID}^{(PUSCH)}$) as 0 to 509. In this case, it is possible to cover all the 510 (30×17) cases according to different base sequence groups and different sequence group hopping patterns.

Definition/setting/provision of the first VCI (e.g. $n_{ID}^{(PUSCH)}$ or $N_{ID}^{(PUSCH)}$) for the PUCCH DMRS and the second VCI (e.g., $n_{ID}^{(PUSCH)}$ or $N_{ID}^{(PUSCH)}$) for the PUSCH DMRS as separate parameters may mean that the available range (i.e. 0 to 503) of the first VCI and the available range (i.e. 0 to 509) of the second VCI are different from each other.

UE Operation Relating to Uplink Reference Signal Generation

A scheme (referred to as a scheme A hereinafter) for supporting backward compatibility) in consideration of operation of a UE (referred to as legacy-UE hereinafter)

according to the legacy wireless communication system and a scheme (referred to as a scheme B hereinafter) optimized for operation of a UE (advanced-UE (A-UE)) according to an advanced wireless communication system will be described in detail on the basis of the above-described uplink reference signal generation scheme according to the present invention.

The scheme A can be considered to be related to the first scheme (i.e. scheme of using $\Delta_{ss}$ set by a higher layer without change) for setting $\Delta_{ss}$ and the scheme B can be considered to be related to the second or third scheme (i.e. scheme of ignoring $\Delta_{ss}$ set by a higher layer and using a specific value of $\Delta_{ss}$ (particularly, $\Delta_{ss}=0$) for setting $\Delta_{ss}$. However, the schemes A and B are not limited to the first, second and third schemes for setting $\Delta_{ss}$.

Scheme A

An uplink reference signal generation operation capable of supporting backward compatibility with the legacy wireless communication system and UE operation will now be described. A UE can acquire the cell-specific parameter $\Delta_{ss}$ for UL RS sequence generation during initial cell access such as a random access procedure through higher layer signaling. In addition, the UE can acquire the PCI (that is, $N_{ID}^{cell}$) of the corresponding cell on the basis of PSS and SSS.

The UE can calculate $f_{ss}^{PUSCH}$ for PUSCH transmission using the acquired PCI and $\Delta_{ss}$ (refer to Equation 8), and thus the UE can calculate a cyclic shift hopping (CSH) pattern of a PUSCH DMRS (refer to Equations 12 and 13). Here, an initial value $c_{init}^{CSH}$ of a pseudo-random sequence c(i) that determines the CSH pattern can be represented by equation 26 when $f_{ss}^{PUSCH}$ in Equation 13 is replaced by $f_{ss}^{PUSCH}$ in equation 8 and $f_{ss}^{PUSCH}$ in Equation 6 is replaced by $f_{ss}^{PUCCH}$ in equation 7.

$$c_{init}^{CSH} = \left\lfloor \frac{N_{ID}^{cell}}{30} \right\rfloor \cdot 2^5 + ((N_{ID}^{cell} \bmod 30) + \Delta_{ss}) \bmod 30 = \quad \text{[Equation 26]}$$

$$\left\lfloor \frac{N_{ID}^{cell}}{30} \right\rfloor \cdot 2^5 + ((N_{ID}^{cell} + \Delta_{ss}) \bmod 30)$$

That is, the UE can acquire a parameter set {PCI, $\Delta_{ss}$, $c_{init}^{CSH}$} in the initial access procedure and thus can generate a UL RS sequence.

Scheme A-1

PUCCH DMRS, PUSCH DMRS and SRS sequences can be generated by applying the parameter set {PCI, $\Delta_{ss}$, $c_{init}^{CSH}$} to Equations 1 to 14. Here, since the PCI corresponds to $n_{ID}^{cell}$, the above description of Equations 1 to 14 can be equally applied and thus redundant description is omitted for clarity.

Scheme A-2

In addition, a UL RS generation operation of the UE, proposed by the present invention, when VCI and CSH pattern seed values are provided to the UE will now be described.

For example, {VCI(m), $c_{init}^{CSH}$(m)} (m=0, 1, 2, ...) may be provided to the UE at a specific time through UE-specific higher layer signaling (e.g. RRC signaling). Here, m is a parameter set index. For example, when M PUCCH DMRS setting sets are present and m indicates one of the M sets, m can have one of values of 0 to M−1. If L PUSCH DMRS setting sets are present and m indicates one of the L sets, m can have one of values of M, M+1, ..., M+L−1. When N SRS setting sets are present and m indicates one of the N sets, m can have one of values of M+L, M+L+1, ..., M+L+N−1.

Here, a plurality of sets of {VCI(m), $c_{init}^{CHS}$(m)} can be semi-statically provided through higher layer signaling, and the value of the specific index m indicating one of the sets, which will be used by the UE, can be dynamically signaled (e.g. L1/L2 signaled).

It is assumed that the number of PUCCH DMRS setting sets is M=1 in the following description. That is, while a plurality of PUCCH DMRS setting sets can be given and one of the sets can be dynamically switched and applied, it is assumed that a VCI for PUCCH DMRS generation is determined as $VCI^{PUCCH}=VCI(0)$ and a seed value for a CSH pattern of the PUCCH DMRS is determined as $c_{init}^{CSH\_PUCCH}=c_{init}^{CSH}(0)$ using a set {VCI(0), $c_{init}^{CSH}$(0)} corresponding to a semi-statically set index m=0 for the PUCCH DMRS in the following description. Here, semi-static setting of {VCI(0), $c_{init}^{CSH}$(0)} corresponding to m=0 means that {VCI(0), $c_{init}^{CSH}$(0)} can be changed at a relatively long interval. Since a PUCCH is a control channel for stably carrying UCI, semi-static DMRS sequence change can be preferable. However, the present invention does not exclude provision of UE-specific higher layer signaling to set a PUCCH DMRS according to a scheme using M of larger than 2.

According to a conventional scheme, $c_{init}^{CSH}$ for a PUCCH DMRS was defined as $c_{init}^{CSH\_PUCCH}=PCI$. When $VCI^{PUCCH}$ is provided to the UE, the present invention provides $c_{init}^{CSH\_PUCCH}$ defined separately (or independently) of $VCI^{PUCCH}$ through UE-specific higher layer signaling, instead of determining $c_{init}^{CSH\_PUCCH}$ as $c_{init}^{CSH\_PUCCH}=VCI^{PUCCH}$ according to the conventional scheme. Accordingly, even when different values of $VCI^{PUCCH}$ are set for MU-MIMO-paired UEs (the same base sequence can be determined even if different values of $VCI^{PUCCH}$ are set), an OCC can be applied to DMRSs of the paired UEs to provide orthogonality by setting the same $c_{init}^{CSH\_PUCCH}$. That is, according to the present invention, $VCI^{PUCCH}$ and $c_{init}^{CSH\_PUCCH}$, which are independent parameters, can be set through UE-specific higher layer signaling, and thus MU-MIMO pairing (particularly, intercell UE pairing) using an OCC can be supported.

An operation of the UE to generate a UL RS when M=1 (i.e. the number of PUCCH DMRS setting sets is 1) and L=1 (i.e. the number of PUSCH DMRS setting sets is 1) will now be described. The following description is for clarity and the present invention can be equally applied to cases in which one or more of M, L and N have a value larger than 1.

Scheme A-2-i

When M=1 and L=1, {VCI(0), $c_{init}^{CSH}$(0)} is defined as a PUCCH parameter set, as described above. Provision of $c_{init}^{CSH}$(0) through higher layer signaling may mean that a PUCCH CSH pattern needs to be determined using $c_{init}^{CSH}$(0) explicitly provided independently of VCI(0). In this case, dynamic indication (or dynamic switching) between the PCI basically provided to the UE and the VCI(0) may be signaled through a specific DCI format.

When $c_{init}^{CSH}$(0) is not provided through higher layer signaling and only VCI(0) is provided, $c_{init}^{CSH\_PUCCH}$ can be determined as $c_{init}^{CSH\_PUCCH}=VCI(0)$. In this case, dynamic indication between the PCI and VCI(0) may be signaled through a specific DCI format.

Here, {VCI(1), $c_{init}^{CSH}$(1)} is defined as a PUSCH DMRS parameter set because L=1. Provision of $c_{init}^{CSH}$(1) through higher layer signaling may mean that a PUSCH CSH pattern needs to be determined using $c_{init}^{CSH}$(1) explicitly given independently of VCI(1) instead of being based on VCI(1) as in the conventional method. In this case, dynamic indication between PUSCH parameter set {VCI(1), $c_{init}^{CSH}(1)$} proposed by the present invention and the legacy parameter set {PCI, $\Delta_{ss}$, $c_{init}^{CSH}$} may be signaled through uplink-related DCI.

Scheme A-2-ii

This scheme represents application of the scheme A-2-i as a mathematical expression when M=1 and L=1. That is, the following embodiments of the present invention can be regarded as schemes for supporting generation of a UL RS having backward compatibility with the legacy system in terms of UE operation. That is, in a system defining 3GPP LTE release-10, forms or calculation processes of equations (refer to description related to Equations 1 to 14) used for the UE to generate a UL RS are maintained without change and parameters applied to the equations are replaced by VCI(m), $f_{ss}^{PUCCH}(m)$, $c_{init}^{CSH}(m)$, etc. proposed by the present invention.

Specifically, the group hopping pattern $f_{gh}(n_s)$ for a PUSCH and a PUCCH is defined as in Equation 3. However, the pseudo-random sequence c(i) can be defined such that it is initialized to $$c_{init} = \left\lfloor \frac{VCI(m)}{30} \right\rfloor$$

at the start of each radio frame by modifying Equation 6. Here, VCI(0) may correspond to the first VCI for the PUCCH and VCI(1) may correspond to the second VCI for the PUSCH.

The sequence shift pattern $f_{ss}$ may be defined separately for the PUCCH and PUSCH. $f_{ss}^{PUCCH}$ for the PUCCH (i.e. m=0) can be determined as $f_{ss}^{PUCCH}(m)=VCI(m) \bmod 30$ by modifying Equation 7 and $f_{ss}^{PUSCH}$ for the PUSCH (i.e. m=1) can be determined as $f_{ss}^{PUSCH}(m)=(f_{ss}^{PUCCH}(m)+\Delta_{ss}) \bmod 30$ by modifying Equation 8. Here, $\Delta_{ss} \in \{0, 1, \ldots, 29\}$, which can be set by a higher layer.

While sequence hopping is applied only to RSs corresponding to $MR_{sc}^{RS} \geq 6N_{sc}^{RB}$ as in the conventional scheme, the pseudo-random sequence generator with respect to sequence hopping can be defined such that it is initialized to $$c_{init} = \left\lfloor \frac{VCI(m)}{30} \right\rfloor \cdot 2^5 + f_{ss}^{PUSCH}$$

at the start of each radio frame by modifying Equation 9.

A cyclic shift value $\alpha_2$ for the PUSCH (that is, m=1) in slot $n_s$ is given as $\alpha_\lambda = 2\pi n_{cs,\lambda}/12$ where $n_{cs,\lambda}=(n_{DMRS}^{(1)}+n_{DMRS}^{(2)}+n_{PN}(n_s)) \bmod 12$, as described with reference to Table 3. Here, a pseudo-random sequence generator for $n_{PN}(n_s)$ may be defined such that it is initialized at the start of each radio frame according to $$c_{init}^{CSH\_PUSCH} = \left\lfloor \frac{VCI(m)}{30} \right\rfloor \cdot 2^5 + f_{ss}^{PUSCH}$$

or initialized according to $c_{init}^{CSH\_PUSCH}=c_{init}^{CSH}(m)$ by modifying Equation 13.

In addition, all PUCCH (i.e. m=0) formats use the cell-specific CS, $n_{cs}^{cell}(n_s,l)$. $n_{cs}^{cell}(n_s,l)$ has different values according to a symbol number l and slot number $n_s$ and is determined according to $n_{cs}^{cell}(n_s,l)=\sum_{i=0}^{7} c(8N_{symb}^{UL} \cdot n_s + 8l+i) \cdot 2^i$. Here, the pseudo-random sequence c(i) can be defined such that it is initialized at the start of each radio frame according to $c_{init}^{CSH\_PUCCH}=VCI$ or $c_{init}^{CSH\_PUCCH}=c_{init}^{CSH}(m)$.

Scheme A-2-iii

It is assumed that M=1 and L=1 as described in the A-2-i and A-2-ii schemes. According to the present scheme, a base sequence generated by the UE is identical to a base sequence generated by a UE' of a target cell. Particularly, the present scheme relates to a method of determining a VCI such that the base sequence generated by the UE is identical to the base sequence generated by the UE' of the target cell while a network signals only the VCI to the UE through higher layer signaling. For example, when a specific cell signals the PUSCH VCI(1) to the UE through higher layer signaling, if the UE' of the target cell uses PCI' and $\Delta_{ss}$' provided by the target cell and a base sequence of the UE', which is generated according to $f_{ss}^{PUCCH'}=PCI' \bmod 30$ and $f_{ss}^{PUSCH'}=(f_{ss}^{PUCCH'}+\Delta_{ss}') \bmod 30$ is present, VCI(1) can be determined as follows.

$$VCI(1) = \left(30 \times \left\lfloor \frac{PCI'}{30} \right\rfloor\right) + f_{ss}^{PUSCH} \quad \text{[Equation 27]}$$

In addition, $f_{ss}^{PUSCH}$ can be arranged as Equation 28.

$$\begin{aligned} f_{ss}^{PUSCH} &= (f_{ss}^{PUSCH'} + 30 - \Delta_{ss}) \bmod 30 \\ &= (f_{ss}^{PUCCH'} \Delta_{ss}' + 30 - \Delta_{ss}) \bmod 30 \\ &= (f_{ss}^{PUCCH'} + \Delta_{ss}' - \Delta_{ss}) \bmod 30 \end{aligned} \quad \text{[Equation 28]}$$

When Equation 28 is applied to Equation 27, the following equation is obtained.

$$VCI(1) = \left(30 \times \left\lfloor \frac{PCI'}{30} \right\rfloor\right) + (f_{ss}^{PUCCH'} + \Delta_{ss}' - \Delta_{ss}) \bmod 30 \quad \text{[Equation 29]}$$

When the eNB provides the value of VCI(1), determined according to Equation 29, to the UE, the UE can generate the same base sequence as that of the UE' of the specific target cell.

The meaning of the above equation is as follows. $f_{ss}^{PUSCH'}$ of the cell to which the UE' belongs equals $$(f_{ss}^{PUCCH'} + \Delta_{ss}') \bmod 30 \text{ and } f_{ss}^{PUCCH'} = PCI' \bmod 30. \ 30 \times \left\lfloor \frac{PCI'}{30} \right\rfloor$$

can be determined such that it has the same value as the integer part (or quotient) of PCT/30 of the target cell to which the UE' belongs. In addition, $(f_{ss}^{PUCCH'}+\Delta_{ss}'-\Delta_{ss}) \bmod 30$ can be determined such that it has the same value as the modulo part (or remainder) of $$\frac{PCI'}{30}$$

of the target cell to which the UE' belongs in order to consider $\Delta_{ss}'$ used by the target cell and to previously eliminate $\Delta_{ss}$ used as a cell-specific value in the cell to which the UE belongs. When VCI(1) determined according to Equation 29 is signaled to the UE, the UE calculates $f_{ss}^{PUSCH}$ according to $f_{ss}^{PUSCH}=(\{VCI(1) \bmod 30\}+\Delta_{ss}) \bmod 30$ only by replacing $n_{ID}^{cell}$ by VCI(1) while using Equations 7 and 8. Here, when the UE calculates $f_{ss}^{PUSCH}$, $\Delta_{ss}$ is eliminated and $\Delta_{ss}'$ is left and thus the UE can generate the same base sequence as that of the UE'.

The above description of the scheme of setting a VCI for the UE of the specific cell such that the UE generates the same base sequence as that of the UE' of the target cell is exemplary. That is, various modifications or modified equations for determining a modulo part of a VCI according to the scheme of previously eliminating $\Delta_{ss}$ of a cell to which a CoMP UE belongs and the scheme of reflecting $\Delta_{ss}'$ of the target cell are within the scope of the present invention.

Scheme B

Scheme B is applicable to the A-UE which is not limited to the conventional calculation method, according to the conventional scheme (e.g. scheme described with reference to Equations 1 to 14) or a scheme of newly defining only parameters of the conventional scheme.

Scheme B-1

The UE can acquire a parameter set $\{PCI, \Delta_{ss}, c_{init}^{CSH}\}$ in an initial access procedure and thus generate a UL RS sequence. Here, PUCCH DMRS, PUSCH DMRS and SRS sequences can be generated by applying the parameter set $\{PCI, \Delta_{ss}, c_{init}^{CSH}\}$ to Equations 1 to 14, as described in scheme A-1.

Scheme B-2

In addition, a UL RS generation operation of the UE when the UE receives $\{VCI(m), c_{init}^{CSH}(m)\}$ (m=0, 1, 2, . . . ) at a specific time through UE-specific higher layer signaling (e.g. RRC signaling) is described below.

Scheme B-2-i

A UL RS generation operation of the UE on the assumption that M=1 (i.e. the number of PUCCH DMRS setting sets is 1) and L=1 (i.e. the number of PUSCH DMRS setting sets is 1) may be identical to that described in the scheme A-2-i. However, the principle of the present invention can be equally applied to cases in which one of M, L and N has a value of larger than 1.

Scheme B-2-ii

This scheme represents application of the scheme B-2-i as a mathematical expression when M=1 and L=1. That is, the following embodiments of the present invention relate to schemes defined differently from UE operation according to the legacy system. That is, the following embodiments relate to a method of calculating base sequence generation in a manner different from the conventional method rather than a method of using the conventional scheme (scheme described with reference to Equations 1 to 14) or newly defining (or replacing) only a parameter in the conventional scheme.

Specifically, the group hopping pattern $f_{gh}(n_s)$ for a PUSCH and a PUCCH is defined as in Equation 3. However, the pseudo-random sequence c(i) can be defined such that it is initialized to $$c_{init} = \left\lfloor \frac{VCI(m)}{30} \right\rfloor$$

at the start of each radio frame by modifying Equation 6. Here, VCI(0) may correspond to the first VCI for the PUCCH and VCI(1) may correspond to the second VCI for the PUSCH.

The sequence shift pattern $f_{ss}$ may be defined separately for the PUCCH and PUSCH. $f_{ss}^{PUCCH}$ for the PUCCH (i.e. m=0) can be determined as $f_{ss}^{PUCCH}(m)=VCI(m) \bmod 30$ by modifying Equation 7. $f_{ss}^{PUCCH}$ for the PUSCH (i.e. m=1) can be determined as $f_{ss}^{PUCCH}(m)=VCI(m) \bmod 30$, different from Equation 8. That is, even if VCI(0) for the PUCCH and VCI(1) for the PUSCH are different from each other, $f_{ss}(m)$ for the PUCCH and PUSCH can be commonly defined as $f_{ss}(m)=VCI(m) \bmod 30$.

While sequence hopping is applied only to RSs corresponding to $M_{sc}^{RS} \geq 6N_{sc}^{RB}$ as in the conventional scheme, the pseudo-random sequence generator with respect to sequence hopping can be defined such that it is initialized to $$c_{init} = \left\lfloor \frac{VCI(m)}{30} \right\rfloor \cdot 2^5 + f_{ss}(m)$$

at the start of each radio frame by modifying Equation 9.

A cyclic shift value $\alpha_2$ for the PUSCH (that is, m=1) in slot $n_s$ is given as $\alpha_2=2\pi n_{cs,\lambda}/12$ where $n_{cs,\lambda}=(n_{DMRS,\lambda}^{(1)}+n_{DMRS,\lambda}^{(2)}+n_{PN}(n_s)) \bmod 12$, as described with reference to Table 3. Here, a pseudo-random sequence generator for $n_{PN}(n_s)$ may be defined such that it is initialized at the start of each radio frame according to $$c_{init}^{CSH\_PUSCH} = \left\lfloor \frac{VCI(m)}{30} \right\rfloor \cdot 2^5 + f_{ss}(m)$$

or initialized according to $c_{init}^{CSH\_PUSCH}=c_{init}^{CSH}(m)$ by modifying Equation 13.

In addition, all PUCCH (i.e. m=0) formats use the cell-specific CS, $n_{cs}^{cell}(n_s,l)$. $n_{cs}^{cell}(n_s,l)$ has different values according to a symbol number l and slot number $n_s$ and is determined according to $n_{cs}^{cell}(n_s,l)=\Sigma_{i=0}^{7} c(8N_{symb}^{UL} \cdot n_s+8l+i) \cdot 2^i$. Here, the pseudo-random sequence c(i) can be defined such that it is initialized at the start of each radio frame according to $c_{init}^{CSH\_PUSCH}=VCI(m)$ or $c_{init}^{CSH\_PUCCH}C_{init}^{CSH}(m)$.

According to the scheme B-2-ii, the UL RS sequence generation operation of the UE can be simplified and optimized. For example, a new calculation method for determining the sequence shift pattern according to $f_{ss}(m)=VCI(m) \bmod 30$ is provided. That is, if VCI(m) is provided through RRC signaling, the operation may be represented on the assumption that $\Delta_{ss}=0$ all the time. In other words, the cell-specific value $\Delta_{ss}$ previously provided to the UE (i.e. previously set by a higher layer) is not used any more after the UE receives VCI(m).

Scheme B-2-iii

It is assumed that M=1 and L=1 as described in the B-2-i and B-2-ii schemes. According to the present scheme, a base sequence generated by the UE is identical to a base sequence generated by a UE' of a target cell. Particularly, the present scheme relates to a method of determining a VCI such that the base sequence generated by the UE is identical to the base sequence generated by the UE' of the target cell while a network signals only the VCI to the UE through higher layer signaling. For example, when a specific cell signals the PUSCH VCI(1) to the UE through higher layer signaling, if the UE' of the target cell uses PCI' and $\Delta_{ss}'$ provided by the target cell and a base sequence of the UE', which is generated according to $f_{ss}^{PUCCH\prime}=PCI'$ mod 30 and $f_{ss}^{PUSCH\prime}=(f_{ss}^{PUCCH\prime}+\Delta_{ss}')$ mod 30 is A present, VCI(1) can be determined as follows.

$$VCI(1) = \left(30 \times \left\lfloor \frac{PCI'}{30} \right\rfloor\right) + f_{ss}^{PUSCH} \quad \text{[Equation 30]}$$
$$= \left(30 \times \left\lfloor \frac{PCI'}{30} \right\rfloor\right) + f_{ss}(m)$$
$$= \left(30 \times \left\lfloor \frac{PCI'}{30} \right\rfloor\right) + VCI(1) \bmod 30$$

When the eNB provides the value of VCI(1), determined according to Equation 30, to the UE, the UE can generate the same base sequence as that of the UE' of the specific target cell.

The meaning of the above equation is described. $f_{ss}^{PUCCH\prime}$ of the cell to which the UE' belongs equals $$\left(f_{ss}^{PUCCH'} + \Delta_{ss}'\right) \bmod 30 \text{ and } f_{ss}^{PUCCH'} = PCI' \bmod 30. \; 30 \times \left\lfloor \frac{PCI'}{30} \right\rfloor$$

can be determined such that it has the same value as the integer part (or quotient) of $$\frac{PCI'}{30}$$

of the target cell to which the UE' belongs. In addition, $f_{ss}^{PUCCH\prime}$ is determined in consideration of only $\Delta_{ss}'$ (that is, UE assumes $\Delta_{ss}=0$ all the time) used in the target cell such that $f_{ss}^{PUCCH\prime}$ has the same value as the modulo part (or remainder) of $$\frac{PCI'}{30}$$

of the target cell to which the UE' belongs. When VCI(1) determined according to Equation 30 is signaled to the UE, the UE can simply calculate $f_{ss}$ according to $f_{ss}(m)=VCI(1)$ mod 30 and can generate the same base sequence as that of the UE' because $\Delta_{ss}'$ has been reflected in $f_{ss}$.

The above description of the scheme of setting a VCI for the UE of the specific cell such that the UE generates the same base sequence as that of the UE' of the target cell is exemplary. That is, various modifications or modified equations for determining a modulo part of a VCI according to the scheme of reflecting only $\Delta_{ss}'$ of the target cell.

In the embodiments for describing the schemes A and B, M, L and N may be arbitrary values and, when each of M, L and N is larger than 1, a specific one of a plurality of RS setting parameter sets corresponding thereto can be dynamically indicated (dynamically switched) through a DCI format.

When N for SRS sequence generation is larger than 1, the CoMP UE can generate a plurality of SRS sequences. Furthermore, even if M, L and N are larger than 1, the cell-specific parameter set (i.e. {PCI, $\Delta_{ss}$, $c_{init}^{CSH}$}) of the corresponding cell, which is initially acquired by the UE, can be included in the dynamically indicated RS setting parameter sets such that the cell-specific parameter set is applied as a default set (i.e. applied in the form of a fall-back mode).

While operations capable of efficiently supporting CoMP operation using an uplink DMRS have been described above, the scope of the present invention is not limited thereto and the principle of the present invention can be equally applied to other uplink RS transmission/reception schemes.

Figure 13:
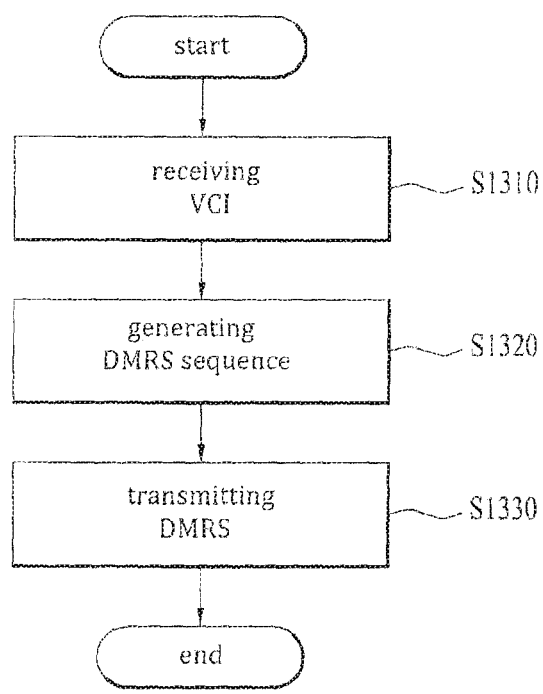
FIG. 13 is a flowchart illustrating an uplink reference signal transmission method according to an embodiment of the present invention.

FIG. 13 is a flowchart illustrating a method for transmitting an uplink DMRS according to an embodiment of the present invention.

A UE may receive a VCI (e.g. $n_{ID}^{RS}$) from an eNB through higher layer signaling (e.g. RRC signaling) in step S1310. Here, a first VCI (e.g. $n_{ID}^{PUCCH}$) for a PUCCH DMRS and a second VCI (e.g. $n_{ID}^{PUSCH}$) for a PUSCH DMRS may be signaled/set as separate parameters (that is, independent parameters).

The UE may generate an RS sequence (e.g. a PUCCH DMRS sequence and/or a PUSCH DMRS sequence) in step S1320. The embodiments of the present invention may be applied to DMRS sequence generation. For example, when the VCI is set by a higher layer, a group hopping pattern, a sequence shift pattern, sequence hopping and/or CS hopping can be determined according to the embodiments of the present invention, and the DMRS sequence can be generated according to the determined group hopping pattern, sequence shift pattern, sequence hopping and/or CS hopping. If the VCI is not set by the higher layer, the PUCCH DMRS sequence and/or the PUSCH DMRS sequence can be generated using a PCI as in a conventional wireless communication system. The above-described embodiments of the present invention may be independently applied or two or more embodiments may be simultaneously applied, and redundant descriptions are avoided for clarity.

The UE may map the generated DMRS sequence to an uplink resource and transmit the DMRS sequence to the eNB in step S1330. The positions of REs mapped to the PUSCH DMRS sequence and the positions of REs mapped to the PUCCH DMRS sequence are as described with reference to FIGS. 5 to 10.

When the eNB receives an uplink RS transmitted from the UE, the eNB can detect the uplink RS on the assumption that the UE generates the uplink RS according to the RS sequence generation scheme proposed by the present invention.

Figure 14:
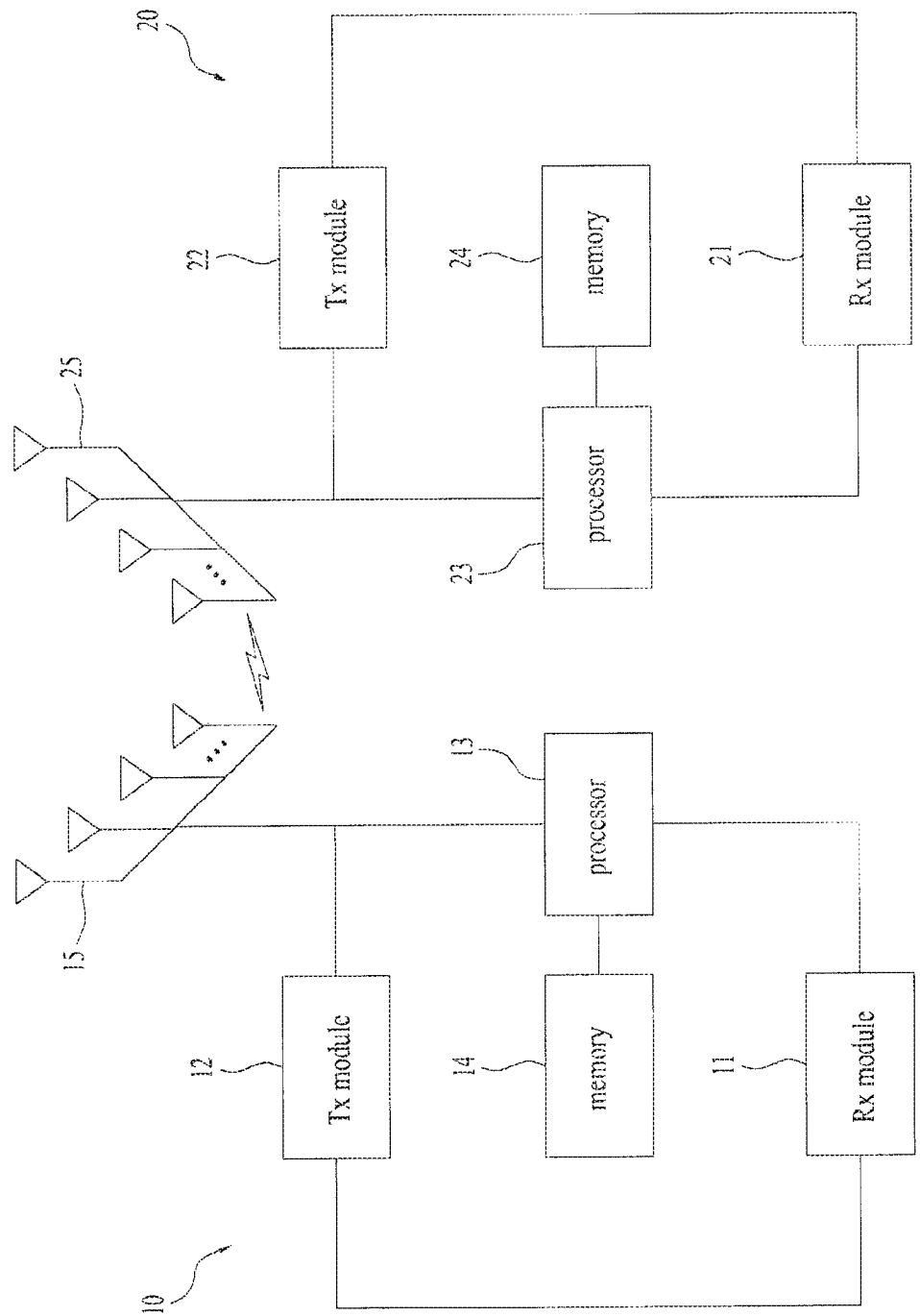
FIG. 14 shows configurations of an eNB and a UE according to an embodiment of the present invention.

FIG. 14 illustrates a configuration of a UE device according to an embodiment of the present invention.

Referring to FIG. 14, a UE device 10 according to an embodiment of the present invention may include a transmitter (Tx module) 12, a receiver (Rx module) 11, a processor 13, a memory 14 and a plurality of antennas 15. The plurality of antennas 15 means that the UE device supports MIMO transmission and reception. The transmitter 12 can transmit signals, data and information to an external device (e.g. eNB). The receiver 11 can receive signals, data and information from an external device (e.g. eNB). The processor 13 can control the overall operation of the UE device 10.

The UE device 10 according to an embodiment of the present invention can be configured to transmit an uplink signal.

The processor 13 of the UE device 10 can receive a VCI (e.g. $n_{ID}^{RS}$) using the receiver 11 from an eNB through higher layer signaling (e.g. RRC signaling). Here, a VCI (e.g. $n_{ID}^{PUCCH}$) for a PUCCH DMRS and a VCI (e.g. $n_{ID}^{PUSCH}$) for a PUSCH DMRS may be independently signaled/set.

The processor 13 of the UE device 10 can be configured to generate an RS sequence (e.g. a PUCCH DMRS sequence and/or a PUSCH DMRS sequence). The embodiments of the present invention may be applied to DMRS sequence generation. For example, when the VCI is set by a higher layer, the processor 13 can determine a group hopping pattern, a sequence shift pattern, sequence hopping and/or CS hopping according to the embodiments of the present invention and generate the DMRS sequence according to the determined group hopping pattern, sequence shift pattern, sequence hopping and/or CS hopping. Alternatively, a group hopping pattern, a sequence shift pattern, sequence hopping and/or CS hopping, which can be generated for each VCI, can be previously generated as a table and appropriate values can be detected from the table according to a set VCI. If the VCI is not set by the higher layer, the PUCCH DMRS sequence and/or the PUSCH DMRS sequence may be generated using a PCI as in a conventional wireless communication system.

The processor 13 of the UE device 10 can map the generated DMRS sequence to an uplink resource and transmit the DMRS sequence to the eNB using the transmitter 12. The positions of REs mapped to the PUSCH DMRS sequence and the positions of REs mapped to the PUCCH DMRS sequence are as described with reference to FIGS. 5 to 10.

In addition, the processor 13 of the UE device 10 processes information received by the UE device 10, information to be transmitted to an external device, etc. The memory 14 can store the processed information for a predetermined time and can be replaced by a component such as a buffer (not shown).

The UE device 10 may be implemented such that the above-described embodiments of the present invention can be independently applied or two or more embodiments can be simultaneously applied, and redundant descriptions are avoided for clarity.

An eNB device 20 according to an embodiment of the present invention can include a transmitter (Tx module) 22, a receiver (Rx module) 21, a processor 23, a memory 24 and antennas 25. When the processor 23 of the eNB device 20 receives an uplink RS transmitted from the UE device 10, the processor 23 of the eNB device 20 can be configured to detect the uplink RS on the assumption that the UE device 10 generates the uplink RS according to the RS sequence generation scheme proposed by the present invention.

While an eNB is exemplified as a downlink transmission entity or an uplink reception entity and a UE is exemplified as a downlink reception entity or an uplink transmission entity in the embodiments of the present invention, the scope of the present invention is not limited thereto. For example, description of the eNB can be equally applied to a case in which a cell, an antenna port, an antenna port group, an RRH, a transmission point, a reception point, an access point or a relay node serves as an entity of downlink transmission to a UE or an entity of uplink reception from the UE. Furthermore, the principle of the present invention described through the various embodiment of the present invention can be equally applied to a case in which a relay node serves as an entity of downlink transmission to a UE or an entity of uplink reception from the UE or a case in which a relay node serves as an entity of uplink transmission to an eNB or an entity of downlink reception from the eNB.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It is obvious to those skilled in the art that claims that are not explicitly cited in each other in the appended claims may be presented in combination as an exemplary embodiment of the present invention or included as a new claim by subsequent amendment after the application is filed.

INDUSTRIAL APPLICABILITY

The above-described embodiments of the present invention can be applied to various mobile communication systems.

What is claimed is:

1. A method for transmitting, by a user equipment (UE), an uplink reference signal, the method comprising:
    obtaining, by the UE, a virtual cell identity $n^{PUSCH}_{ID}$ and a physical cell identity $N^{cell}_{ID}$;
    generating, by the UE, a first reference signal for demodulation of a physical uplink shared channel (PUSCH) based on the virtual cell identity $n^{PUSCH}_{ID}$;
    transmitting, by the UE, the first reference signal;
    generating, by the UE, a second reference signal for demodulation of a physical uplink control channel (PUCCH) based on the physical cell identity $N^{cell}_{ID}$; and
    transmitting, by the UE, the second reference signal,
    wherein the virtual cell identity $n^{PUSCH}_{ID} \in \{0, \ldots, 509\}$, and the physical layer cell identity $N^{cell}_{ID} \in \{0, \ldots, 503\}$.

2. The method according to claim 1,
    wherein each of the first and second reference signals is generated using a sequence-shift pattern, and
    wherein a sequence-shift pattern $f^{PUSCH}_{SS}$ for the first reference signal is determined according to $f^{PUSCH}_{SS} = n^{PUSCH}_{ID} \mod 30$, and a sequence shift pattern $f^{PUSCH}_{SS}$ for the second reference signal is determined according to $f^{PUSCH}_{SS} = N^{cell}_{ID} \mod 30$.

3. The method according to claim 2, further comprising:
    receiving a higher layer signal including $\Delta_{ss} \in \{0, \ldots, 29\}$, wherein the sequence-shift pattern $f_{ss}^{PUSCH}$ for the first reference signal is determined according to $f_{SS}^{PUSCH}=n_{ID}^{PUSCH}$ mod 30 irrespective of $\Delta_{ss}\epsilon\{0,\ldots,29\}$.

4. The method according to claim 1,
wherein the virtual cell identity $n_{ID}^{PUSCH}$ is provided by a higher layer signal.

5. A user equipment (UE) for transmitting an uplink reference signal, the UE comprising:
 a transmitter, and
  a processor configured to control the receiver and the transmitter, the processor configured to:
   obtain a virtual cell identity $n_{ID}^{PUSCH}$ and a physical cell identity $N_{ID}^{cell}$;
   generate a first reference signal for demodulation of a physical uplink shared channel (PUSCH) based on the virtual cell identity $n_{ID}^{PUSCH}$;
   control the transmitter to transmit the first reference signal;
   generate a second reference signal for demodulation of a physical uplink control channel (PUCCH) based on the physical cell identity $N_{ID}^{cell}$; and
   control the transmitter to transmit the second reference signal, wherein the virtual cell identity $n_{ID}^{PUSCH}\epsilon\{0,\ldots,509\}$, and the physical layer cell identity $N_{ID}^{cell}\epsilon\{0,\ldots,503\}$.

6. The UE according to claim 5,
wherein each of the first and second reference signals is generated using a sequence-shift pattern, and
wherein a sequence-shift pattern $f_{SS}^{PUSCH}$ for the first reference signal is determined according to $f_{SS}^{PUSCH}=n_{ID}^{PUSCH}$ mod 30, and a sequence shift pattern $f_{SS}^{PUSCH}$ for the second reference signal is determined according to $f_{SS}^{PUSCH}=N_{ID}^{cell}$ mod 30.

7. The UE according to claim 6,
wherein the processor controls the transmitter to receive a higher layer signal including $\Delta_{ss}\epsilon\{0,\ldots,29\}$, and
wherein the sequence shift pattern $f_{ss}^{PUSCH}$ for the first reference signal is determined according to $f_{SS}^{PUSCH}=n_{ID}^{PUSCH}$ mod 30 irrespective of $\Delta_{ss}\epsilon\{0,\ldots,29\}$ provided by a higher layer signal.

8. The UE according to claim 5,
wherein the virtual cell identity $n_{ID}^{PUSCH}$ is provided by a higher layer signal.

* * * * *